US010013161B2

(12) United States Patent
Murrett et al.

(10) Patent No.: US 10,013,161 B2
(45) Date of Patent: *Jul. 3, 2018

(54) DEVICES, METHODS, AND GRAPHICAL USER INTERFACES FOR NAVIGATING AND EDITING TEXT

(71) Applicant: Apple Inc., Cupertino, CA (US)

(72) Inventors: Martin J. Murrett, San Francisco, CA (US); Matthew Todd Schomer, Santa Cruz, CA (US); Christopher Douglas Weeldreyer, San Carlos, CA (US); James Vernon Van Boxtel, Ridgefield, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,250

(22) Filed: May 8, 2015

(65) Prior Publication Data

US 2015/0248233 A1 Sep. 3, 2015

Related U.S. Application Data

(63) Continuation of application No. 13/217,747, filed on Aug. 25, 2011, now Pat. No. 9,032,338.

(Continued)

(51) Int. Cl.
*G06F 3/048* (2013.01)
*G06F 3/0488* (2013.01)
(Continued)

(52) U.S. Cl.
CPC .......... *G06F 3/04883* (2013.01); *G06F 3/041* (2013.01); *G06F 3/0485* (2013.01); *G06F 17/24* (2013.01)

(58) Field of Classification Search
CPC ..... G06F 3/0488; G06F 3/04883; G06F 17/21
See application file for complete search history.

(56) References Cited

U.S. PATENT DOCUMENTS

| 4,734,689 A | * | 3/1988 | Kurakake | G09G 5/343 345/684 |
| 5,481,278 A | | 1/1996 | Shigematsu et al. | |

(Continued)

FOREIGN PATENT DOCUMENTS

| CN | 101910988 A | 12/2010 |
| CN | 101943990 A | 1/2011 |

(Continued)

OTHER PUBLICATIONS

Office Action received for European Patent Application No. 12726302.8 dated Jan. 22, 2016, 6 pages.

(Continued)

*Primary Examiner* — Dino Kujundzic
(74) *Attorney, Agent, or Firm* — Dentons US LLP

(57) ABSTRACT

An electronic device displays text of an electronic document on a display; displays an insertion marker at a first position in the text of the electronic document; detects a first horizontal gesture on a touch-sensitive surface; in response to a determination that the first horizontal gesture satisfies a first set of one or more predefined conditions: translates the electronic document on the display in accordance with a direction of the first horizontal gesture, and maintains the insertion marker at the first position in the text; and, in response to a determination that the first horizontal gesture satisfies a second set of one or more predefined conditions, moves the insertion marker by one character in the text from the first position to a second position in the text in accordance with the direction of the first horizontal gesture.

44 Claims, 29 Drawing Sheets

Related U.S. Application Data

(60) Provisional application No. 61/491,321, filed on May 30, 2011.

(51) Int. Cl.
*G06F 3/041* (2006.01)
*G06F 3/0485* (2013.01)
*G06F 17/24* (2006.01)

(56) References Cited

U.S. PATENT DOCUMENTS

| | | | |
|---|---|---|---|
| 7,110,864 | B2 | 9/2006 | Restrepo et al. |
| 8,341,529 | B1 | 12/2012 | Li et al. |
| 8,756,522 | B2* | 6/2014 | Lee .................. G06F 3/04883 715/773 |
| 9,032,338 | B2 | 5/2015 | Murrett et al. |
| 2004/0263487 | A1* | 12/2004 | Mayoraz .............. G06F 3/0481 345/173 |
| 2006/0125803 | A1 | 6/2006 | Westerman et al. |
| 2007/0152978 | A1 | 7/2007 | Kocienda et al. |
| 2007/0152980 | A1 | 7/2007 | Kocienda et al. |
| 2007/0178941 | A1* | 8/2007 | Fujimoto .............. G06F 3/0485 455/566 |
| 2008/0036743 | A1 | 2/2008 | Westerman et al. |
| 2008/0094368 | A1 | 4/2008 | Ording et al. |
| 2008/0122796 | A1 | 5/2008 | Jobs et al. |
| 2008/0165142 | A1 | 7/2008 | Kocienda et al. |
| 2008/0168349 | A1 | 7/2008 | Lamiraux et al. |
| 2008/0168404 | A1 | 7/2008 | Ording |
| 2008/0180408 | A1 | 7/2008 | Forstall et al. |
| 2008/0259040 | A1 | 10/2008 | Ording et al. |
| 2009/0109182 | A1 | 4/2009 | Fyke et al. |
| 2009/0167700 | A1 | 7/2009 | Westerman et al. |
| 2009/0228792 | A1 | 9/2009 | Van Os et al. |
| 2009/0249258 | A1 | 10/2009 | Tang |
| 2010/0156813 | A1 | 6/2010 | Duarte et al. |
| 2010/0235785 | A1 | 9/2010 | Ording et al. |
| 2010/0235793 | A1 | 9/2010 | Ording et al. |
| 2010/0283753 | A1 | 11/2010 | Ohshita |
| 2010/0293460 | A1 | 11/2010 | Budelli |
| 2010/0309148 | A1 | 12/2010 | Fleizach et al. |
| 2011/0001694 | A1* | 1/2011 | Homma ................ G06F 3/0485 345/156 |
| 2011/0069006 | A1 | 3/2011 | Liu et al. |
| 2011/0122159 | A1 | 5/2011 | Bergsten et al. |
| 2011/0231789 | A1 | 9/2011 | Bukurak et al. |
| 2011/0320978 | A1 | 12/2011 | Horodezky et al. |
| 2012/0120002 | A1* | 5/2012 | Ota ...................... G06F 3/0488 345/173 |
| 2012/0311507 | A1 | 12/2012 | Murrett et al. |
| 2013/0024820 | A1 | 1/2013 | Kirkpatrick |
| 2013/0113720 | A1 | 5/2013 | Van Eerd et al. |

FOREIGN PATENT DOCUMENTS

| | | |
|---|---|---|
| WO | 1999/038149 A1 | 7/1999 |
| WO | 2006/020305 A2 | 2/2006 |
| WO | 2009/072475 A1 | 6/2009 |

OTHER PUBLICATIONS

Office Action received for Chinese Patent Application No. 201280026797.1, dated Nov. 4, 2015, 31 pages (18 pages of English Translation and 13 pages of Official Copy).

International Preliminary Report on Patentability received for PCT Patent Application No. PCT/US2012/039867, dated Dec. 12, 2013, 8 pages.

Microsoft, "List of the Keyboard Shortcuts that are Available in Windows XP" available at <http://support.microsoft.com/kb/301583>, retrieved on Aug. 22, 2014, 2 pages.

Microsoft, "Touch", available at <http://msdn.microsoft.com/en-us/library/windows/desktop/dn742468.aspx>, retrieved on Aug. 22, 2014, 11 pages.

Rodney, Dan, "List of Mac OS X Keyboard Shortcuts & Keystrokes" available at <http://www.danrodney.com/mac/>, on Aug. 22, 2014, 4 pages.

Introduction to Word Processing, available at "http://www2.raritanval.edu/departments/cis/full-time/Schwarz/security/word_one_pt2.htm", Nov. 17, 2008, 9 pages.

Final Office Action received for U.S. Appl. No. 13/217,747, dated Feb. 21, 2014, 22 pages.

Final Office Action received for U.S. Appl. No. 13/217,747, dated Sep. 10, 2014, 24 pages.

Non-Final Office Action received for U.S. Appl. No. 13/217,747, dated Aug. 16, 2013, 19 pages.

Non-Final Office Action received for U.S. Appl. No. 13/217,747, dated Jan. 4, 2013, 17 pages.

Notice of Allowance received for U.S. Appl. No. 13/217,747, dated Jan. 8, 2015, 11 pages.

International Search Report and Written Opinion received for PCT Patent Application No. PCT/US2012/039867, dated Aug. 13, 2012, 11 pages.

Villamor et al., "Touch Gesture Reference Guide", Apr. 15, 2010, 7 pages.

Office Action received for Chinese Patent Application No. 201280026797.1, dated Jul. 22, 2016, 19 pages (4 pages of English Translation and 15 pages of Official Copy).

Office Action received for Chinese Patent Application No. 201280026797.1, dated Apr. 14, 2017, 18 pages (3 pages of English translation and 15 pages of Official Copy).

* cited by examiner

DEVICES, METHODS, AND GRAPHICAL USER INTERFACES FOR NAVIGATING AND EDITING TEXT

RELATED APPLICATIONS

This application is a continuation of U.S. patent application Ser. No. 13/217,747, filed on Aug. 25, 2011, now U.S. Pat. No. 9,032,338, issued on May 12, 2015, which claims priority to U.S. Provisional Application No. 61/491,321, filed May 30, 2011, entitled "Devices, Methods, and Graphical User Interfaces for Navigating and Editing Text," which are incorporated herein by reference in their entirety.

TECHNICAL FIELD

This relates generally to electronic devices with touch-sensitive surfaces, including but not limited to electronic devices with touch-sensitive surfaces that display and edit electronic documents.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to interact with an electronic document on a display.

Exemplary interactions include navigating and editing an electronic document. For example, a user often needs to scroll or translate the electronic document to text that needs to be edited. The user also needs to position or reposition an insertion marker in the text to be edited and then input additional text (e.g., via a keyboard). These document navigation and editing operations are typically performed numerous times while working on an electronic document. These interactions may be performed in any application that includes text entry capabilities (e.g., a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), or a spreadsheet application (e.g., Numbers from Apple Inc. of Cupertino, Calif.)).

But existing methods for navigating and editing text via touch-sensitive surfaces are cumbersome and inefficient. For example, positioning an insertion marker by dragging the insertion marker in accordance with a finger being moved across a touch screen requires careful hand-eye coordination and a steady finger to correctly position the insertion marker at the desired location. In addition, the heuristics used to disambiguate whether a finger gesture is trying to reposition the insertion marker (without moving the document) or whether the finger gesture is trying to move the entire document (without repositioning the insertion marker) make repositioning the insertion marker a slow and tedious process, thereby frustrating users and wasting energy. This latter consideration is particularly important in battery-operated devices.

SUMMARY

Accordingly, there is a need for electronic devices with faster, more efficient methods and interfaces for navigating and editing text via touch-sensitive surfaces. Such methods and interfaces may complement or replace conventional methods for navigating and editing text via touch-sensitive surfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying text of an electronic document on the display; displaying an insertion marker at a first position in the text of the electronic document; detecting a first horizontal gesture on the touch-sensitive surface; in response to a determination that the first horizontal gesture satisfies a first set of one or more predefined conditions: translating the electronic document on the display in accordance with a direction of the first horizontal gesture, and maintaining the insertion marker at the first position in the text; and, in response to a determination that the first horizontal gesture satisfies a second set of one or more predefined conditions that is distinct from the first set of one or more predefined conditions, moving the insertion marker by one character in the text from the first position to a second position in the text in accordance with the direction of the first horizontal gesture.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying text of an electronic document on the display; displaying an insertion marker at a first position in the text of the electronic document; detecting a first horizontal gesture on the touch-sensitive surface; in response to a determination that the first horizontal gesture satisfies a first set of one or more predefined conditions: translating the electronic document on the display in accordance with a direction of the first horizontal gesture, and maintaining the insertion marker at the first position in the text; and, in response to a determination that the first horizontal gesture satisfies a second set of one or more predefined conditions that is distinct from the first set of one or more predefined conditions, moving the insertion marker by one character in the text from the first position to a second position in the text in accordance with the direction of the first horizontal gesture.

In accordance with some embodiments, a computer readable storage medium has stored therein instructions which when executed by an electronic device with a display and a touch-sensitive surface, cause the device to: display text of an electronic document on the display; display an insertion marker at a first position in the text of the electronic document; detect a first horizontal gesture on the touch-sensitive surface; in response to a determination that the first horizontal gesture satisfies a first set of one or more predefined conditions: translate the electronic document on the display in accordance with a direction of the first horizontal gesture, and maintain the insertion marker at the first position in the text; and, in response to a determination that the first horizontal gesture satisfies a second set of one or more predefined conditions that is distinct from the first set of one or more predefined conditions, move the insertion marker by one character in the text from the first position to a second position in the text in accordance with the direction of the first horizontal gesture.

In accordance with some embodiments, a graphical user interface on an electronic device with a display, a touch-sensitive surface, a memory, and one or more processors to execute one or more programs stored in the memory includes text of an electronic document and an insertion marker at a first position in the text of the electronic document. A first horizontal gesture is detected on the touch-sensitive surface. In response to a determination that the first horizontal gesture satisfies a first set of one or more predefined conditions, the electronic document is translated on the display in accordance with a direction of the first horizontal gesture, and the insertion marker is maintained at the first position in the text. In response to a determination that the first horizontal gesture satisfies a second set of one or more predefined conditions that is distinct from the first set of one or more predefined conditions, the insertion marker is moved by one character in the text from the first position to a second position in the text in accordance with the direction of the first horizontal gesture.

In accordance with some embodiments, an electronic device includes: a display; a touch-sensitive surface; means for displaying text of an electronic document on the display; means for displaying an insertion marker at a first position in the text of the electronic document; means for detecting a first horizontal gesture on the touch-sensitive surface; in response to a determination that the first horizontal gesture satisfies a first set of one or more predefined conditions, means for translating the electronic document on the display in accordance with a direction of the first horizontal gesture, and means for maintaining the insertion marker at the first position in the text; and, in response to a determination that the first horizontal gesture satisfies a second set of one or more predefined conditions that is distinct from the first set of one or more predefined conditions, means for moving the insertion marker by one character in the text from the first position to a second position in the text in accordance with the direction of the first horizontal gesture.

In accordance with some embodiments, an information processing apparatus for use in an electronic device with a display and a touch-sensitive surface includes: means for displaying text of an electronic document on the display; means for displaying an insertion marker at a first position in the text of the electronic document; means for detecting a first horizontal gesture on the touch-sensitive surface; in response to a determination that the first horizontal gesture satisfies a first set of one or more predefined conditions, means for translating the electronic document on the display in accordance with a direction of the first horizontal gesture, and means for maintaining the insertion marker at the first position in the text; and, in response to a determination that the first horizontal gesture satisfies a second set of one or more predefined conditions that is distinct from the first set of one or more predefined conditions, means for moving the insertion marker by one character in the text from the first position to a second position in the text in accordance with the direction of the first horizontal gesture.

In accordance with some embodiments, an electronic device includes a display unit configured to display text of an electronic document and an insertion marker at a first position in the text of the electronic document, a touch-sensitive surface unit configured to receive gestures, and a processing unit coupled to the display unit and the touch-sensitive surface unit. The processing unit is configured to detect a first horizontal gesture on the touch-sensitive surface unit; in response to a determination that the first horizontal gesture satisfies a first set of one or more predefined conditions, translate the electronic document on the display unit in accordance with a direction of the first horizontal gesture, and maintain the insertion marker at the first position in the text; and, in response to a determination that the first horizontal gesture satisfies a second set of one or more predefined conditions that is distinct from the first set of one or more predefined conditions, move the insertion marker by one character in the text from the first position to a second position in the text in accordance with the direction of the first horizontal gesture.

Thus, electronic devices with displays and touch-sensitive surfaces are provided with faster, more efficient methods and interfaces for navigating and editing text, thereby increasing the effectiveness, efficiency, and user satisfaction with such devices. Such methods and interfaces may complement or replace conventional methods for navigating and editing text via touch-sensitive surfaces.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
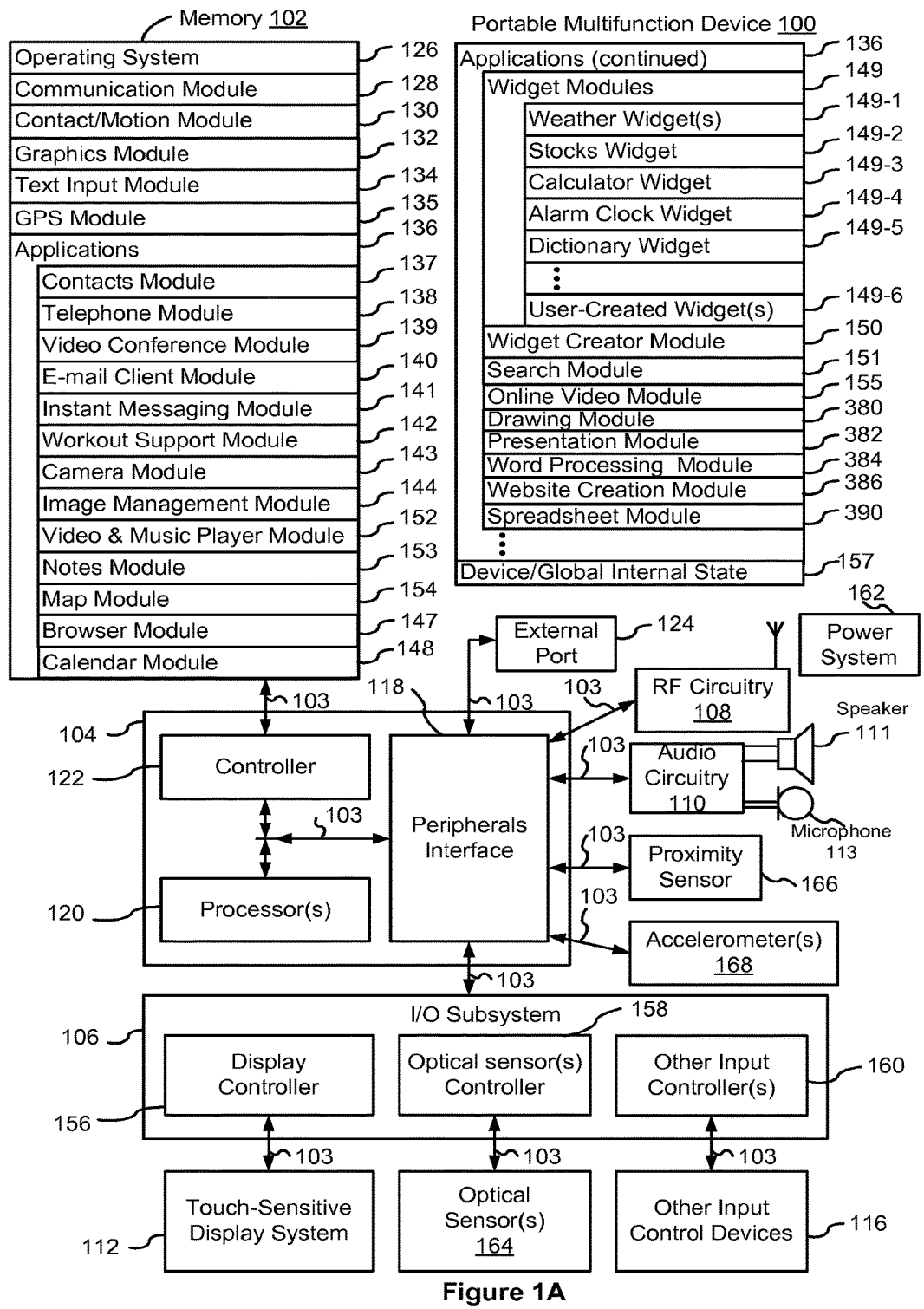
FIG. 1A is a block diagram illustrating a portable multifunction device with a touch-sensitive display in accordance with some embodiments.

Many electronic devices with touch-sensitive surfaces include applications with document text editing capabilities. A user often needs to scroll or translate an electronic document to text that needs to be edited. The user also needs to position or reposition an insertion marker in the text to be edited and then input additional text (e.g., via a keyboard). These document navigation and editing operations are typically performed numerous times while working on an electronic document. Existing methods typically position an insertion marker by dragging the insertion marker in accordance with a finger being moved across a touch screen, which requires good hand-eye coordination and a steady finger to correctly position the insertion marker at the desired location. In addition, the heuristics currently used to determine whether a finger gesture is trying to reposition the insertion marker (without moving the document) or whether the finger gesture is trying to move the entire document (without repositioning the insertion marker) make existing methods for repositioning the insertion marker slow and tedious.

The devices and methods described below overcome these problems by using quick finger swipe gestures to move an insertion marker by predefined amounts (e.g., move by one character, one word, one sentence, one line, or one paragraph), along with improved heuristics for disambiguating whether the gesture is meant to reposition the insertion marker or translate the electronic document.

For example, when the user performs, a horizontal swipe gesture, the device repositions the insertion marker if a quick swipe is detected (e.g., based on an initial velocity of the gesture), but translates the document if a slower, more deliberate swipe gesture is detected. If the gesture is determined to be a gesture to move the insertion marker, the insertion marker typically moves in the direction of the gesture by an amount based on the number of fingers in the gesture. For example, a single-finger horizontal swipe gesture moves the insertion marker by one character, a two-finger horizontal swipe gesture moves the insertion marker by a word, and a three-finger horizontal swipe gesture moves the insertion marker to the beginning/end of the current line of text.

Thus, fast imprecise finger swipe gestures can be used to precisely move an insertion marker by a desired amount, while slower, more deliberate gestures can be used to navigate (e.g., scroll or translate) the document. This makes navigating and editing text via a touch-sensitive surface faster and more efficient.

Below, FIGS. 1A-1B, 2, 3, and 7 provide a description of exemplary devices. FIGS. 4A-4B and 5A-5P illustrate exemplary user interfaces for navigating and editing text via a touch-sensitive surface. FIGS. 6A-6F are flow diagrams illustrating a method of navigating and editing text via a touch-sensitive surface. The user interfaces in FIGS. 5A-5P are used to illustrate the processes in FIGS. 6A-6F.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
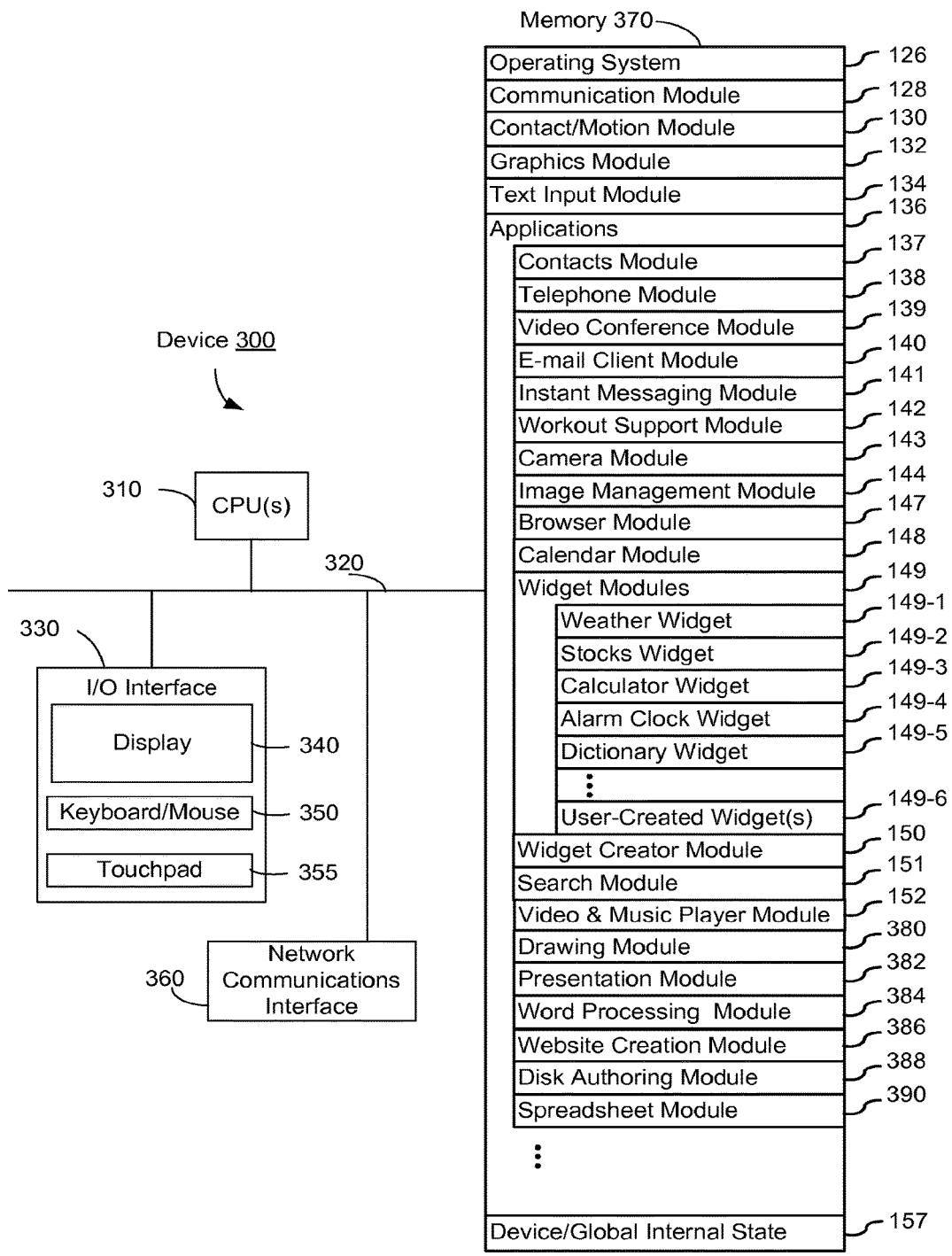
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player module and a music player module;
notes module 153;
map module 154; and/or
online video module 155.

Examples of other applications 136 that may be stored in memory 102 include other word processing applications (e.g., word processing module 384), other image editing applications, drawing applications (e.g., drawing module 380), presentation applications (presentation module 382), spreadsheet applications (e.g., spreadsheet module 390), website creation applications (e.g., website creation module 386), JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
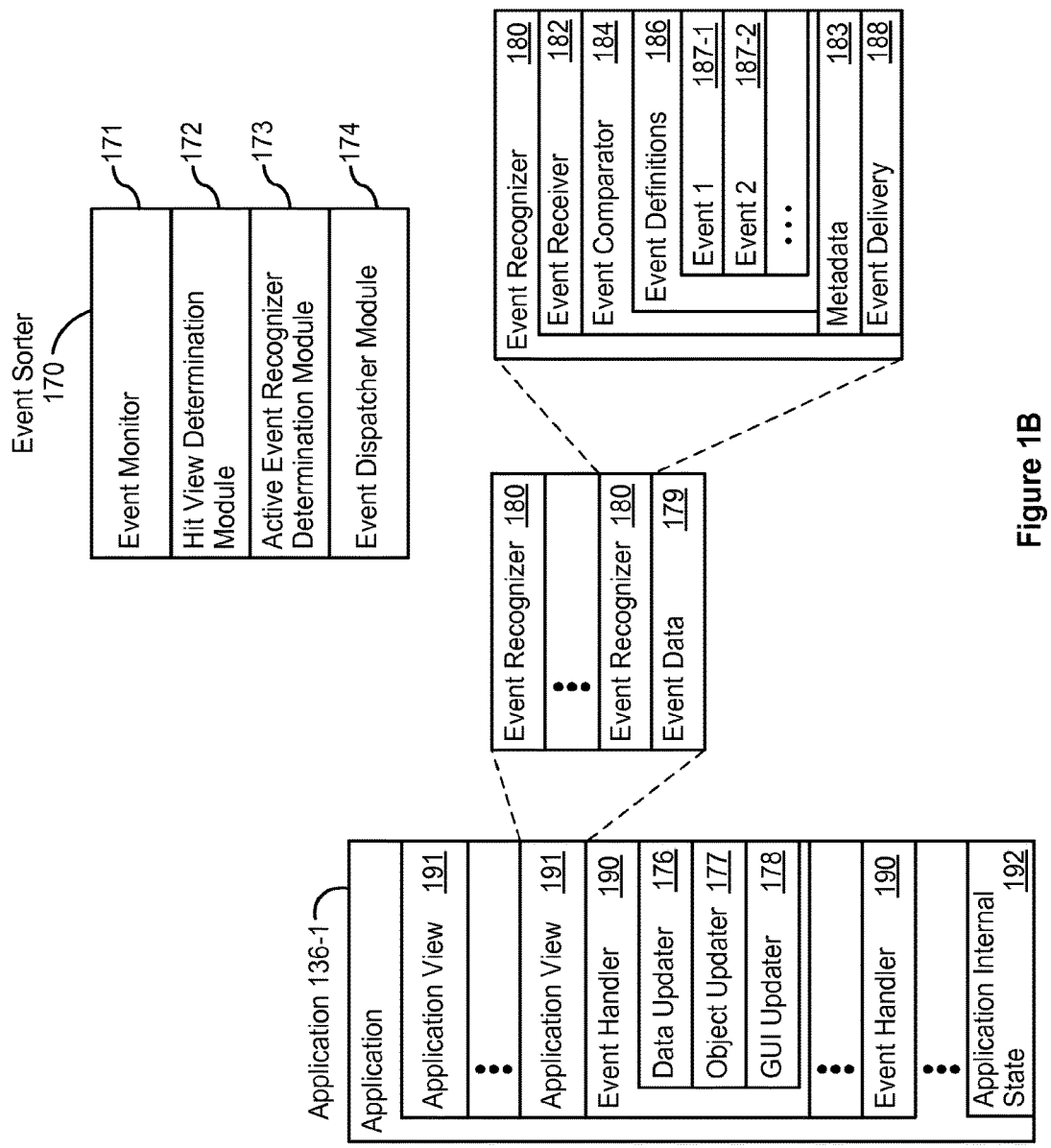
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
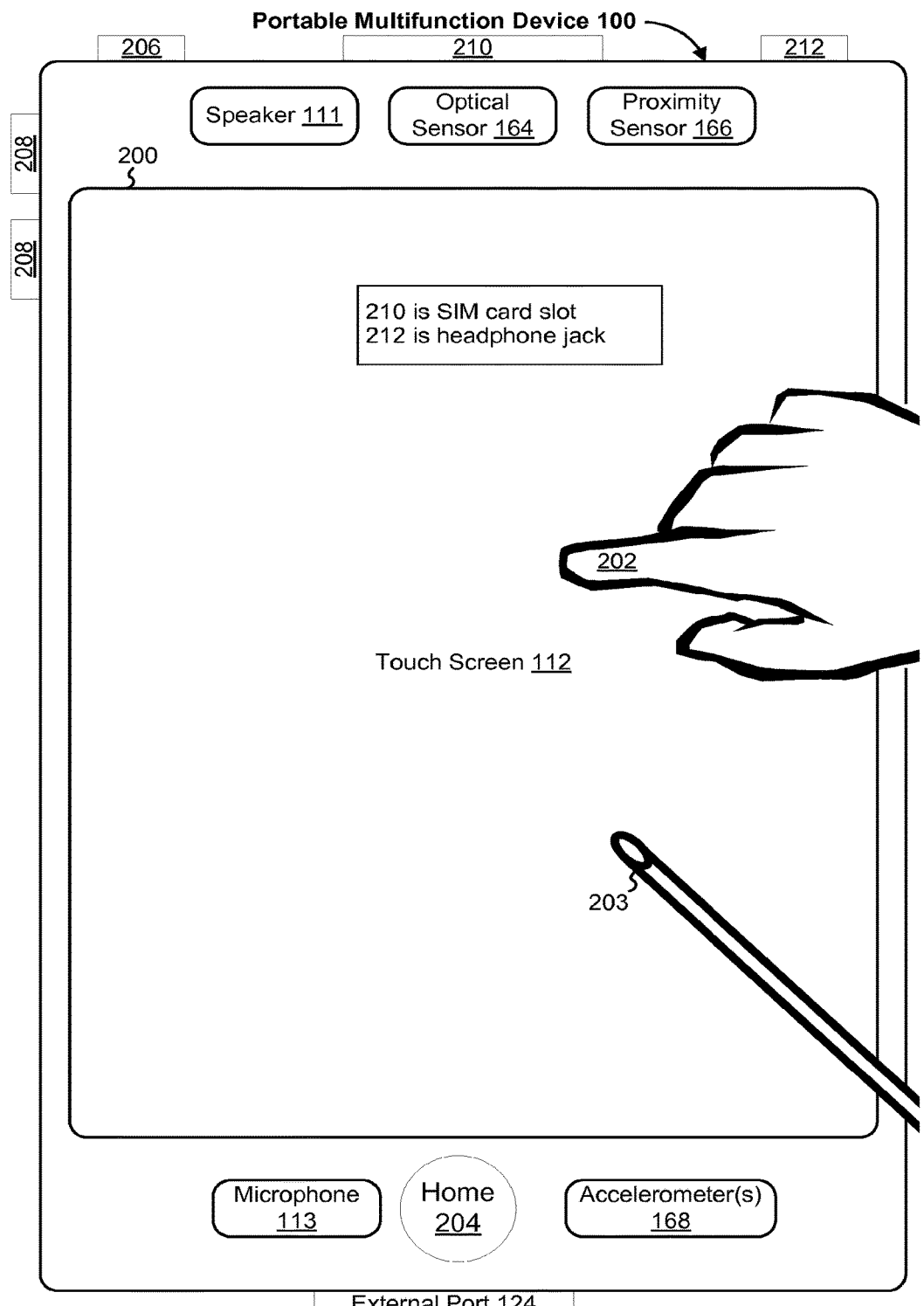
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may or may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
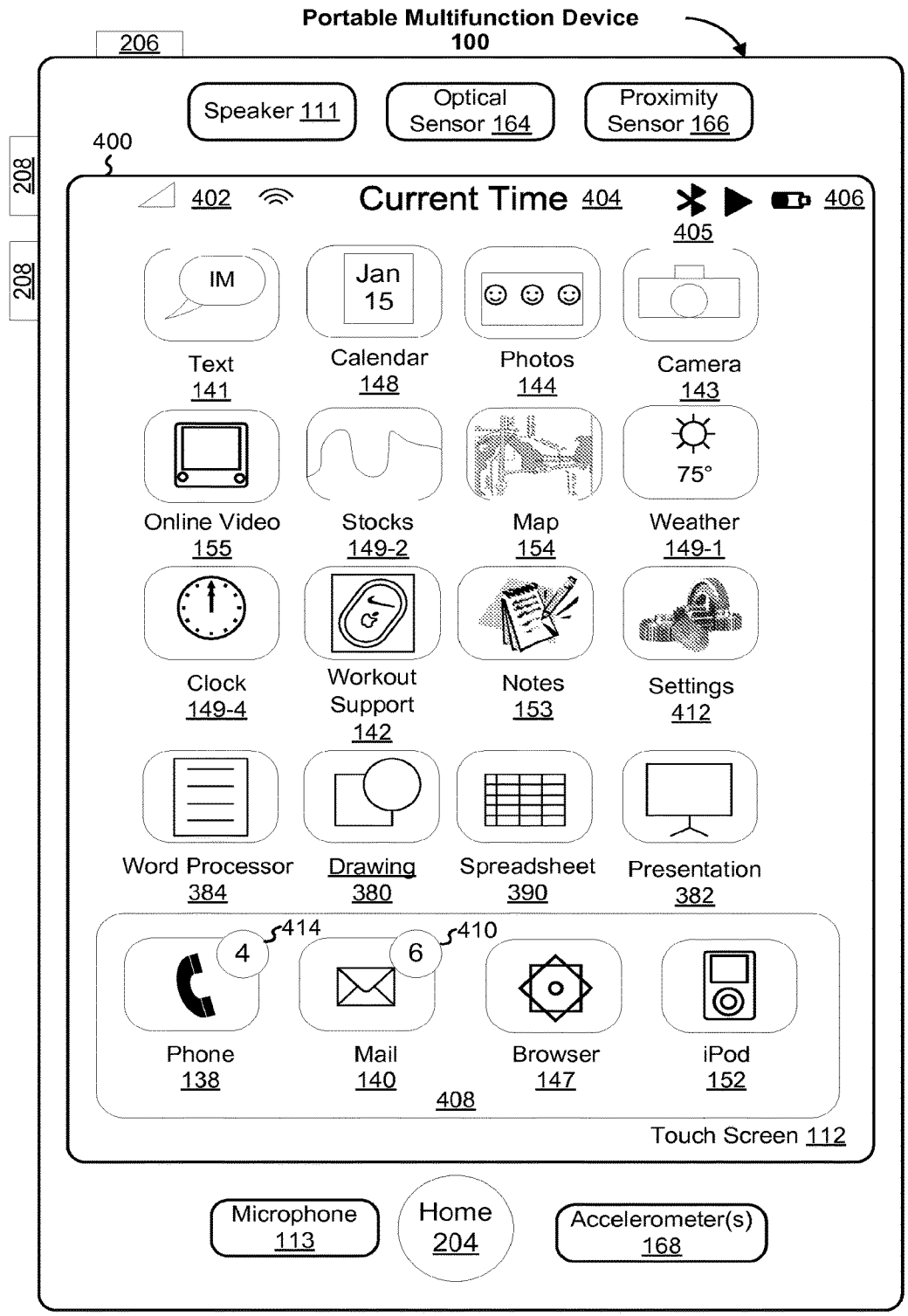
FIG. 4A illustrates an exemplary user interface for a menu of applications on a portable multifunction device in accordance with some embodiments.
Figure 5A:
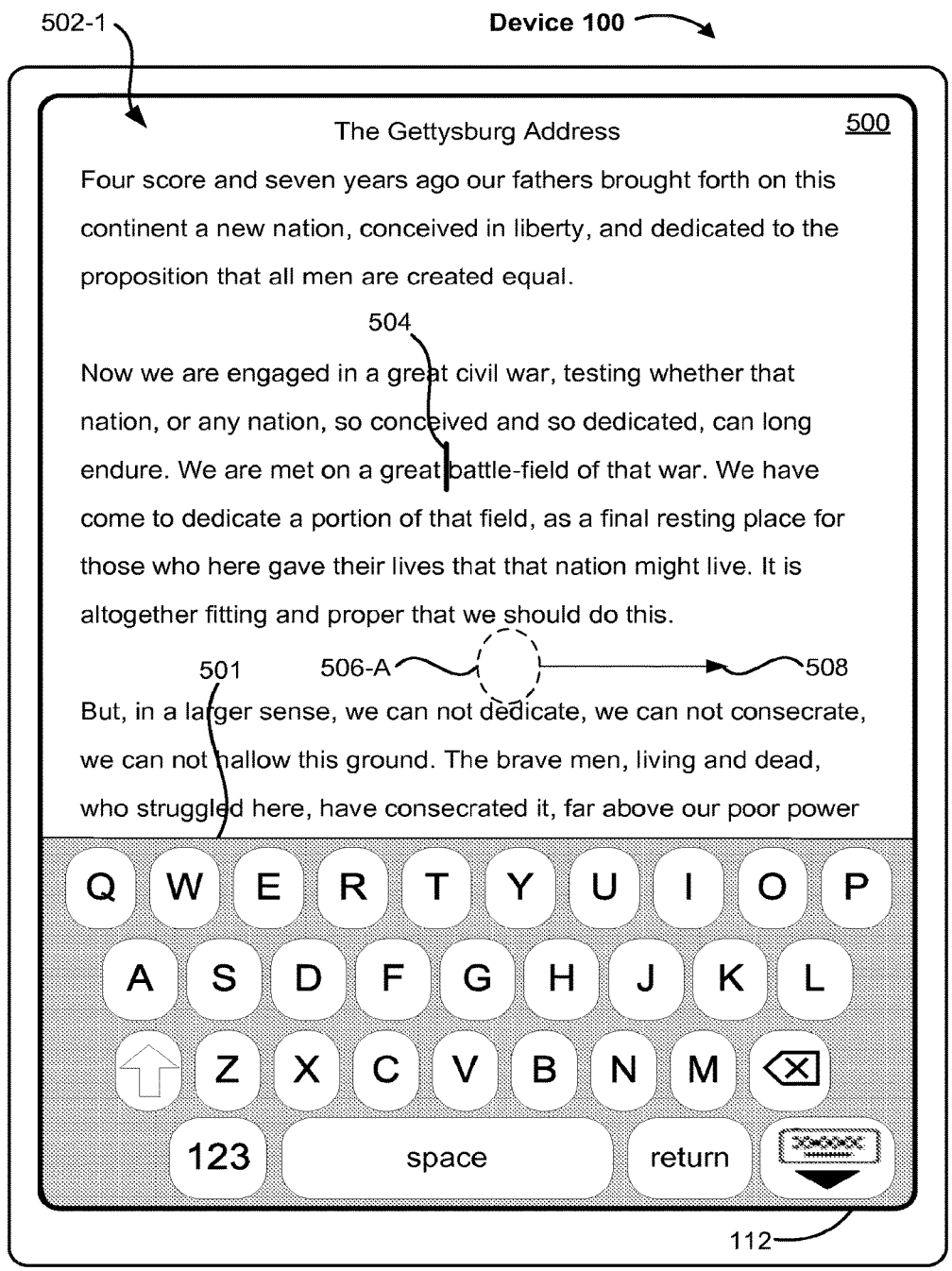
FIGS. 5A-5P illustrate exemplary user interfaces for navigating and editing text via a touch-sensitive surface in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Phone 138, which may include an indicator 414 of the number of missed calls or voicemail messages;
- E-mail client 140, which may include an indicator 410 of the number of unread e-mails;
- Browser 147; and
- Video and music player 152, also referred to as iPod (trademark of Apple Inc.) module 152; and Icons for other applications, such as:

- IM 141;
- Image management 144;
- Camera 143;
- Weather 149-1;
- Stocks 149-2;
- Workout support 142;
- Calendar 148;
- Alarm clock 149-4;
- Map 154;
- Notes 153;
- Settings 412, which provides access to settings for device 100 and its various applications 136;
- Online video module 155, also referred to as YouTube (trademark of Google Inc.) module 155;
- Word processor 384;
- Drawing 380;
- Spreadsheet 390; and
- Presentation 382.

Figure 4B:
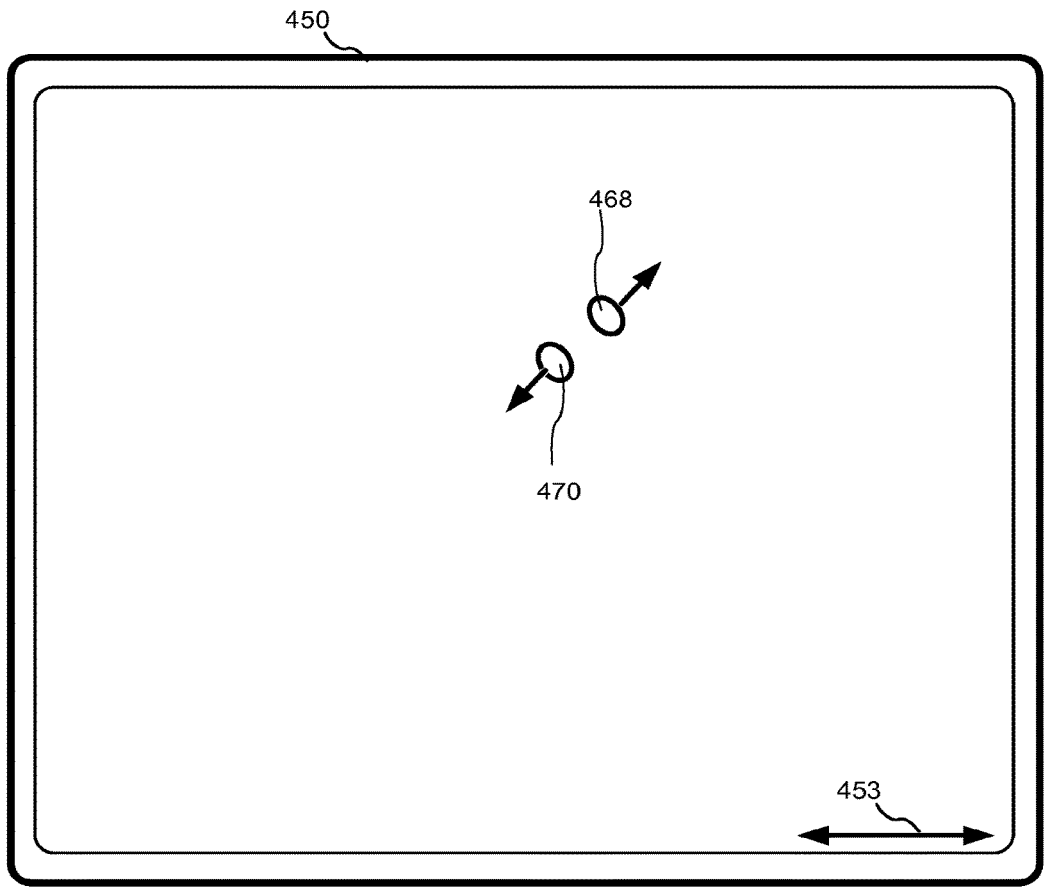
FIG. 4B illustrates an exemplary user interface for a multifunction device with a touch-sensitive surface that is separate from the display in accordance with some embodiments.
Figure 4B:
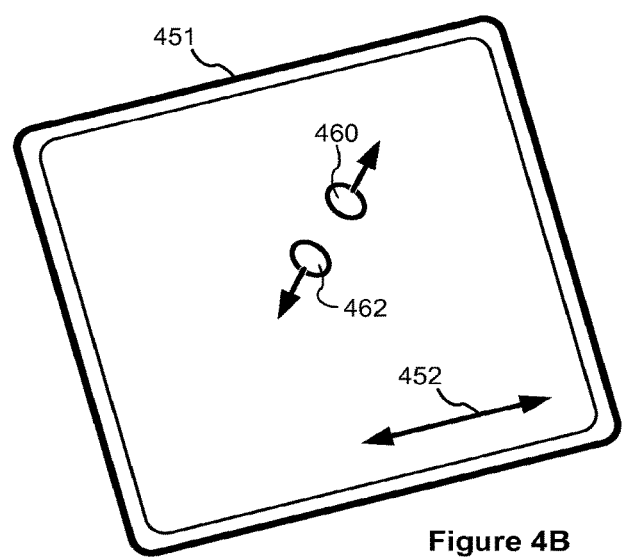

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5P illustrate exemplary user interfaces for navigating and editing text via a touch-sensitive surface in accordance with some embodiments. The user interfaces in these figures are used to illustrate the processes described below, including the processes in FIGS. 6A-6F.

FIG. 5A illustrates electronic document 500 being displayed on touch screen 112 of device 100. Electronic document 500 includes text 502. In some embodiments, the electronic document is a plain text document, a word processing document, a presentation document with text, a spreadsheet with text, or a drawing document with text.

In FIG. 5A, text 502-1 in a first page is displayed on touch screen 112. Insertion marker 504 is displayed at a position in text 502-1, namely, just before the word "battle-field" in the sentence "We are met on a great battle-field of that war," as shown in FIG. 5A. For ease of explanation, the position of insertion marker 504, relative to text 502-1, as shown in FIG. 5A (i.e., just before the word "battle-field" in the sentence "We are met on a great battle-field of that war.") will be referred to below as "Position 1."

In some embodiments, electronic document 500 is displayed in an edit mode, and insertion marker 504 is displayed in text 502 while document 500 is displayed in edit mode. While in edit mode, virtual keyboard 501, for receiving user text entry, may be displayed on touch screen 112.

Also illustrated in FIG. 5A is gesture 506 that is detected on touch screen 112. Gesture 506 includes finger contact 506-A on touch screen 112 and movement 508 of finger contact 506-A. Movement 508 is horizontal or substantially horizontal (e.g., movement 508 is within 10, 20, or 30 degrees off from true horizontal), and rightward.

Figure 5B:
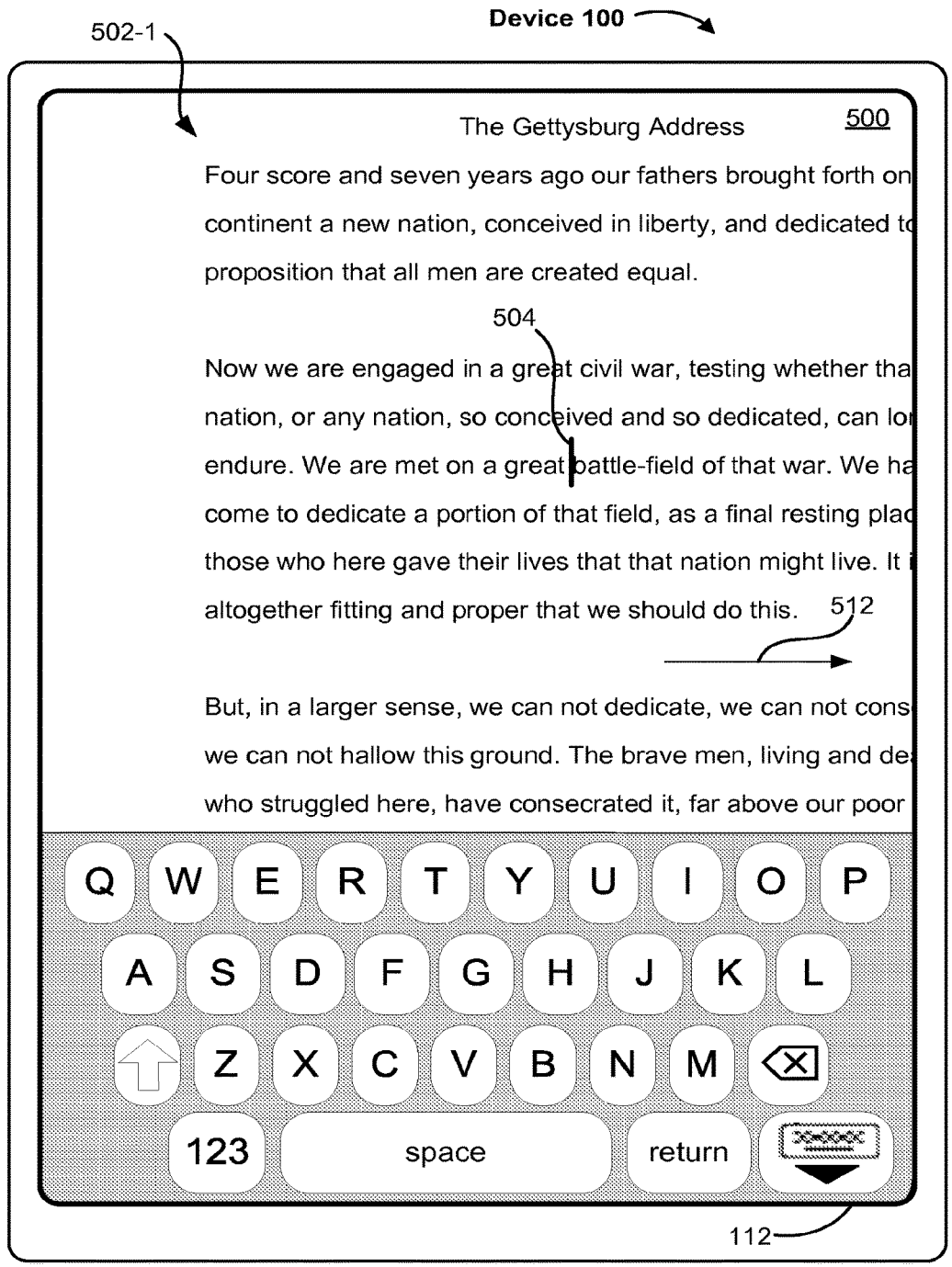

The action performed by device 100 in response to detection of gesture 506 depends on whether gesture 506 is determined to satisfy one or more particular predefined conditions. In some embodiments, the one or more predefined conditions include conditions regarding an initial velocity of gesture 506. For example, if the initial velocity of gesture 506 is less than a predefined threshold velocity, document 500 (including text 502) is translated (e.g., by panning or by scrolling) on touch screen 112 in accordance with the direction of movement 508 of gesture 506. For example, as shown in FIG. 5B, document 500, including text 502-1, is panned rightward 512 in accordance with the direction of movement 508 of gesture 506. Insertion marker 504 is moved rightward along with text 502-1 in order to maintain its position at Position 1. In some embodiments, the predefined threshold velocity is 250, 333, or 500 points per second.

Figure 5C:
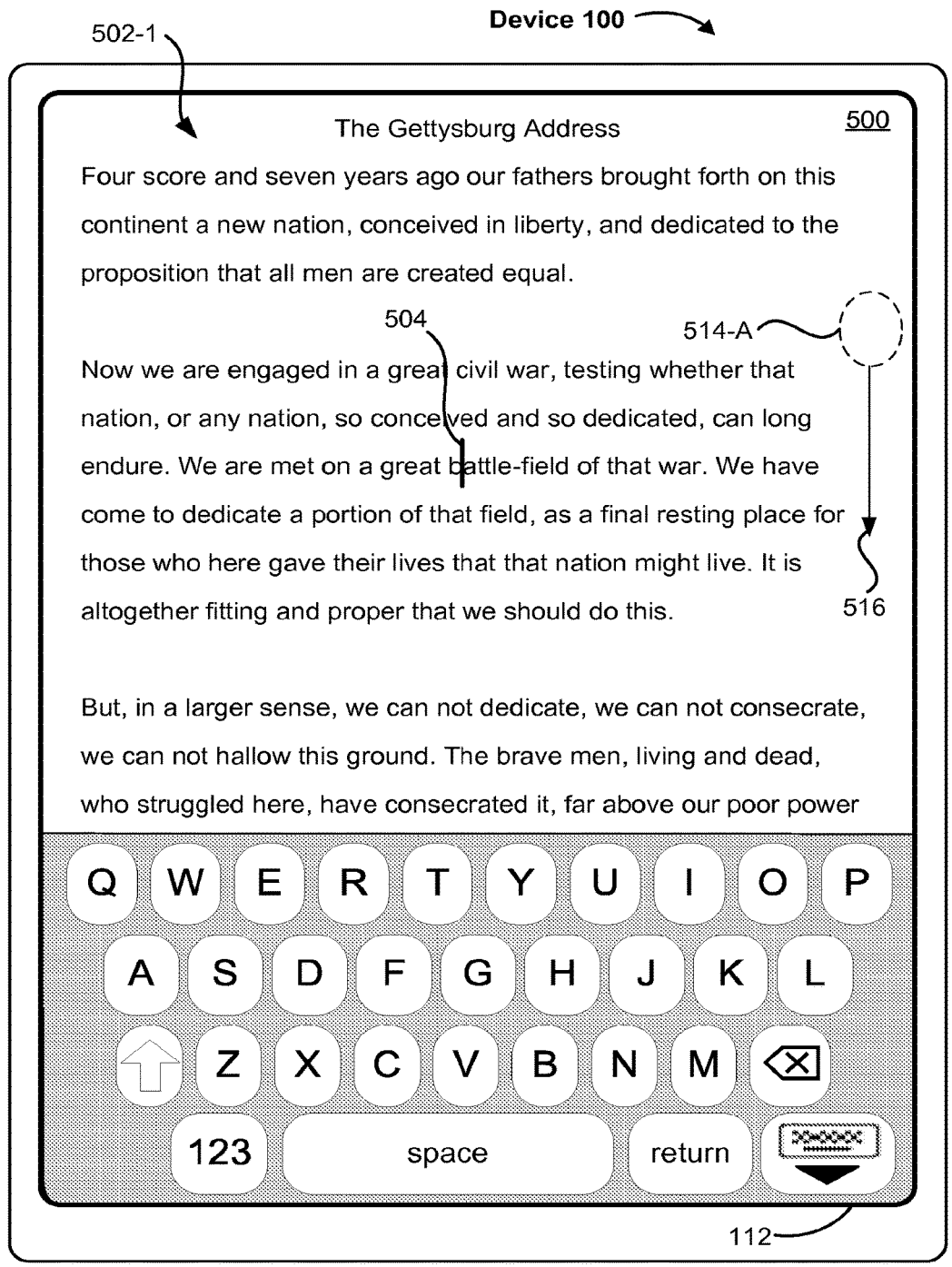

If the initial velocity of gesture 506 is more than the predefined threshold velocity, insertion marker 504 is moved by one character in text 502-1 from Position 1 in accordance with the rightward direction of movement 508 of gesture 506, as shown in FIG. 5C. In FIG. 5C, one character rightward (in accordance with the direction of movement 508) from Position 1 places insertion marker 504 at a position between "b" and "a" in the word "battle-field" in the same sentence as Position 1. For ease of explanation, the position of insertion marker 504, relative to text 502-1, as shown in FIG. 5C (i.e., between "b" and "a" in the word "battle-field" in the sentence "We are met on a great battle-field of that war.") will be referred to below as "Position 2."

In some other embodiments, the predefined conditions include a distance moved by contact 506-A during movement 508 in a predefined initial time (e.g., 0.05, 0.10, 0.15, 0.20, or 0.25 seconds) since contact 506-A was detected on touch screen 112. If the distance moved is less than a predefined initial movement threshold (e.g., movement by 25, 50, or 75 points, where 1 point=1/72 inches), document 500 is translated, as described above with reference to FIG. 5B. If the distance moved is greater than the predefined initial movement threshold, insertion marker 504 is moved by one character to Position 2, as described above with reference to FIG. 5C.

In some embodiments, the conditions associated with moving insertion marker 504 by one character to Position 2 further includes a condition that the detected gesture be a single-finger gesture (which is satisfied by gesture 506). That is, insertion marker 504 is moved by one character if the initial velocity or the initial movement condition is satisfied, and gesture 506 is a single-finger gesture. In some embodiments, the conditions associated with translating document 500 are indifferent with respect to whether the detected gesture is a single-finger or a multi-finger gesture.

Returning to FIG. 5C, gesture 514 is detected on touch screen 112 while insertion marker 504 is positioned at Position 2. Gesture 514 includes finger contact 514-A and movement 516 of contact 514-A. Movement 516 is vertical or substantially vertical (e.g., movement 516 is within 10, 20, or 30 degrees off from true vertical), and downward.

Figure 5D:
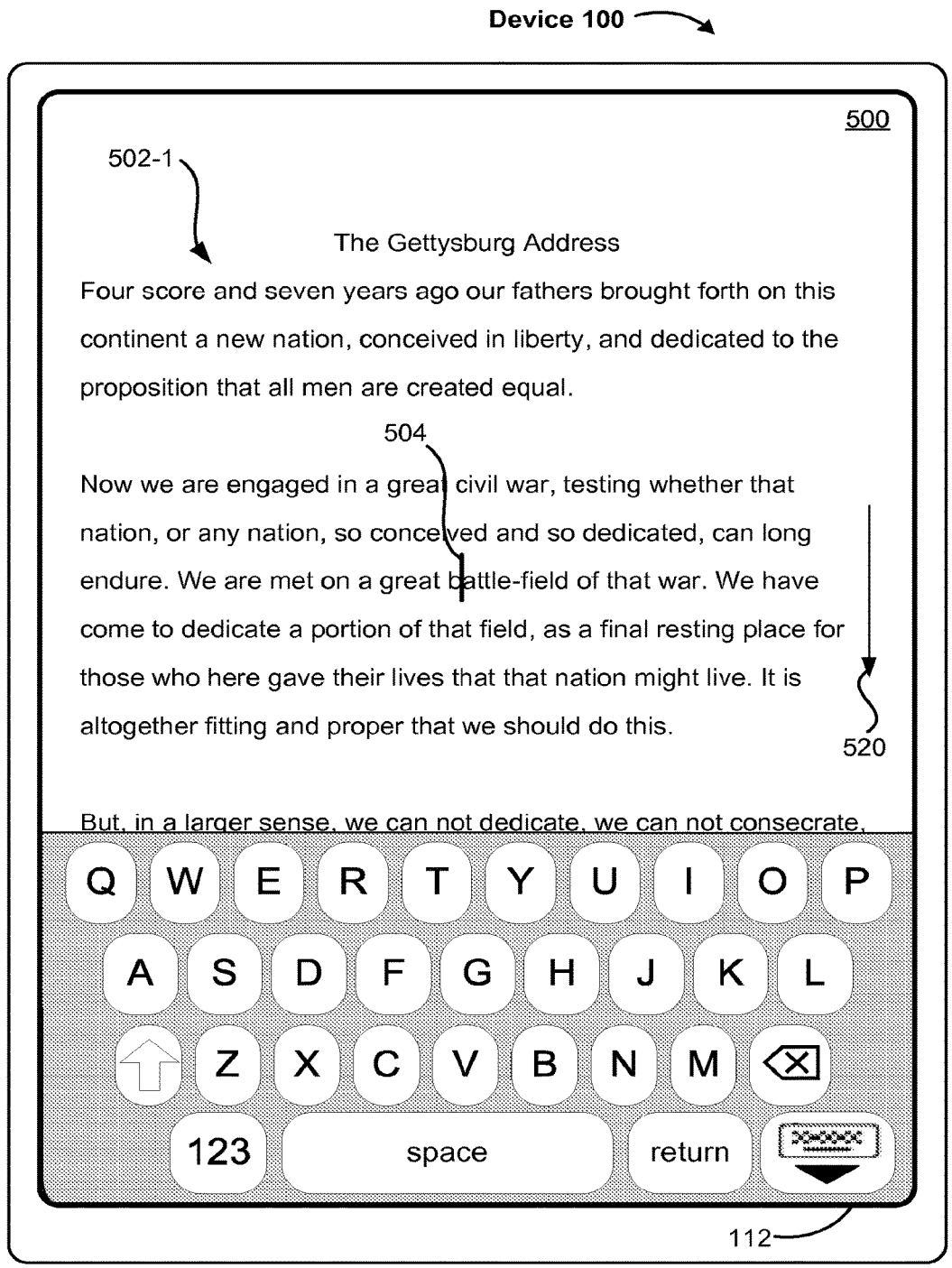

The action performed by device 100 in response to detection of gesture 514 depends on whether gesture 514 is determined to satisfy one or more particular predefined conditions. In some embodiments, the one or more predefined conditions include conditions regarding an initial velocity of gesture 514. For example, if the initial velocity of gesture 514 is less than a predefined threshold velocity, document 500 (including text 502) is translated (e.g., by panning or by scrolling) on touch screen 112 in accordance with the direction of movement 516 of gesture 514. For example, as shown in FIG. 5D, document 500, including text 502-1, is scrolled downward 520 in accordance with the direction of movement 516 of gesture 514. Insertion marker 504 is moved downward along with text 502-1 in order to maintain its position at Position 2. In some embodiments, the predefined threshold velocity is 250, 333, or 500 points per second.

Figure 5E:
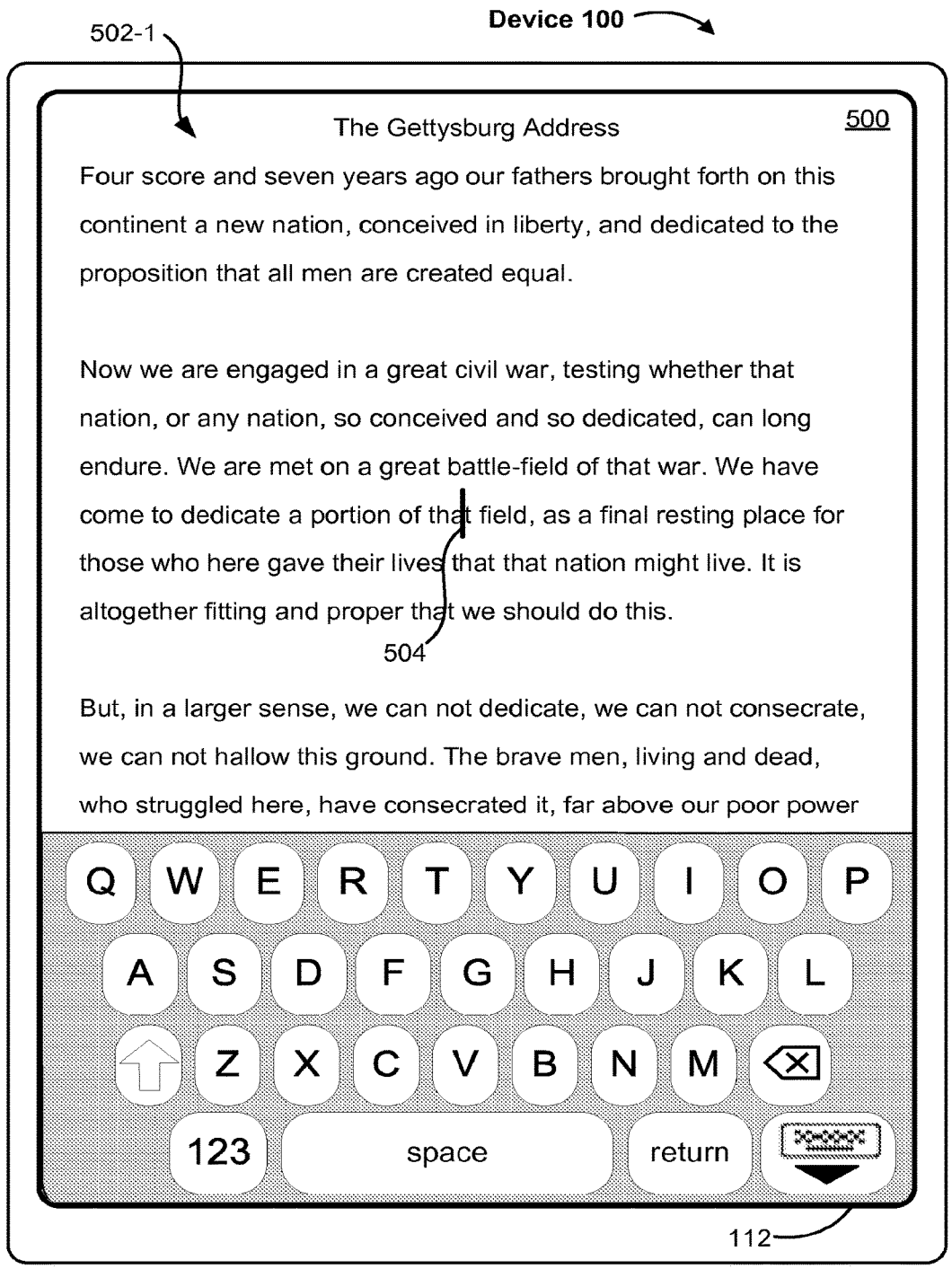

If the initial velocity of gesture 514 is more than the predefined threshold velocity, insertion marker 504 is moved by one vertically adjacent line in text 502-1 from Position 2 in accordance with the direction of movement 516 of gesture 514, as shown in FIG. 5E. In FIG. 5E, one adjacent line downward (in accordance with the direction of movement 516) from the line of text containing Position 2 places insertion marker 504 at a position between "a" and "t" in the word "that" in the partial sentence "come to dedicate a portion of that field, as a final resting place for." For ease of explanation, the position of insertion marker 504, relative to text 502-1, as shown in FIG. 5E (i.e., between "a" and "t" in the word "that" in the partial sentence "come to dedicate a portion of that field, as a final resting place for") will be referred to below as "Position 3."

In some embodiments, the movement of insertion marker 504 by one adjacent line is vertical or substantially vertical. In some embodiments, the position to which insertion marker 504 moves from Position 1 is a position in the adjacent line that is closest to an imaginary vertical line intersecting Position 1.

In some other embodiments, the predefined conditions include a distance moved by contact 514-A during movement 516 in a predefined initial time (e.g., 0.05, 0.10, 0.15, 0.20, or 0.25 seconds) since contact 514-A was detected on touch screen 112. If the distance moved is less than a predefined initial movement threshold (e.g., movement by 25, 50, or 75 points, where 1 point=1/72 inches), document 500 is translated, as described above with reference to FIG. 5D. If the distance moved is greater than the predefined initial movement threshold, insertion marker 504 is moved by one adjacent line to Position 3, as described above with reference to FIG. 5E.

In some embodiments, the conditions associated with moving insertion marker 504 by one adjacent line to Position 3 further includes a condition that the detected gesture be a single-finger gesture (which is satisfied by gesture 514). That is, insertion marker 504 is moved by one adjacent line if the initial velocity or the initial movement condition is satisfied, and gesture 514 is a single-finger gesture. In some embodiments, the conditions associated with translating document 500 are indifferent with respect to whether the detected gesture is a single-finger or a multi-finger gesture.

Figure 5F:
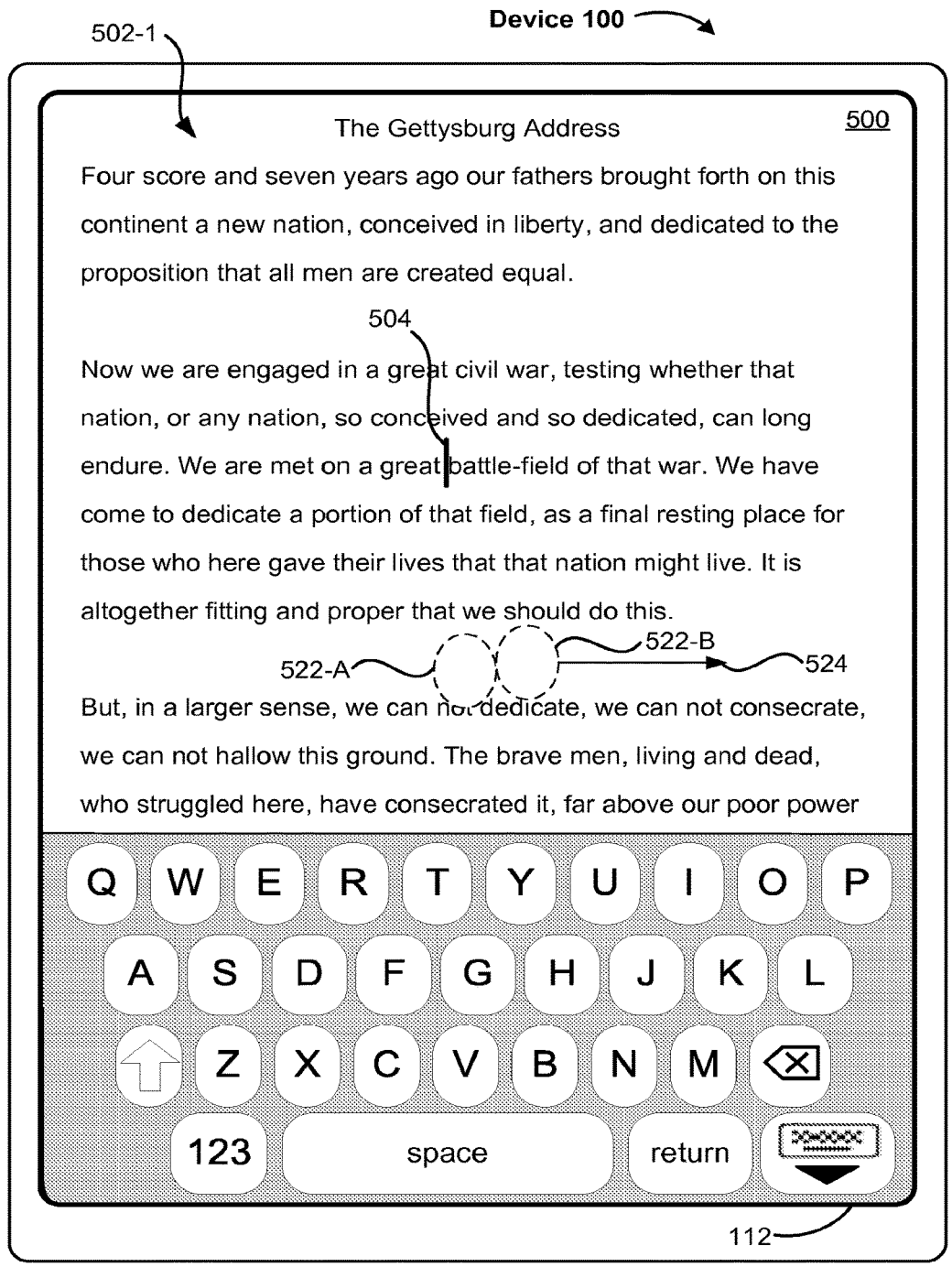

FIG. 5F illustrates gesture 522 detected on touch screen 112. Gesture 522 is a two-finger gesture; gesture 522 includes finger contacts 522-A and 522-B and movement 524 of finger contacts 522-A and 522-B. Movement 524 is horizontal or substantially horizontal, and rightward.

Figure 5G:
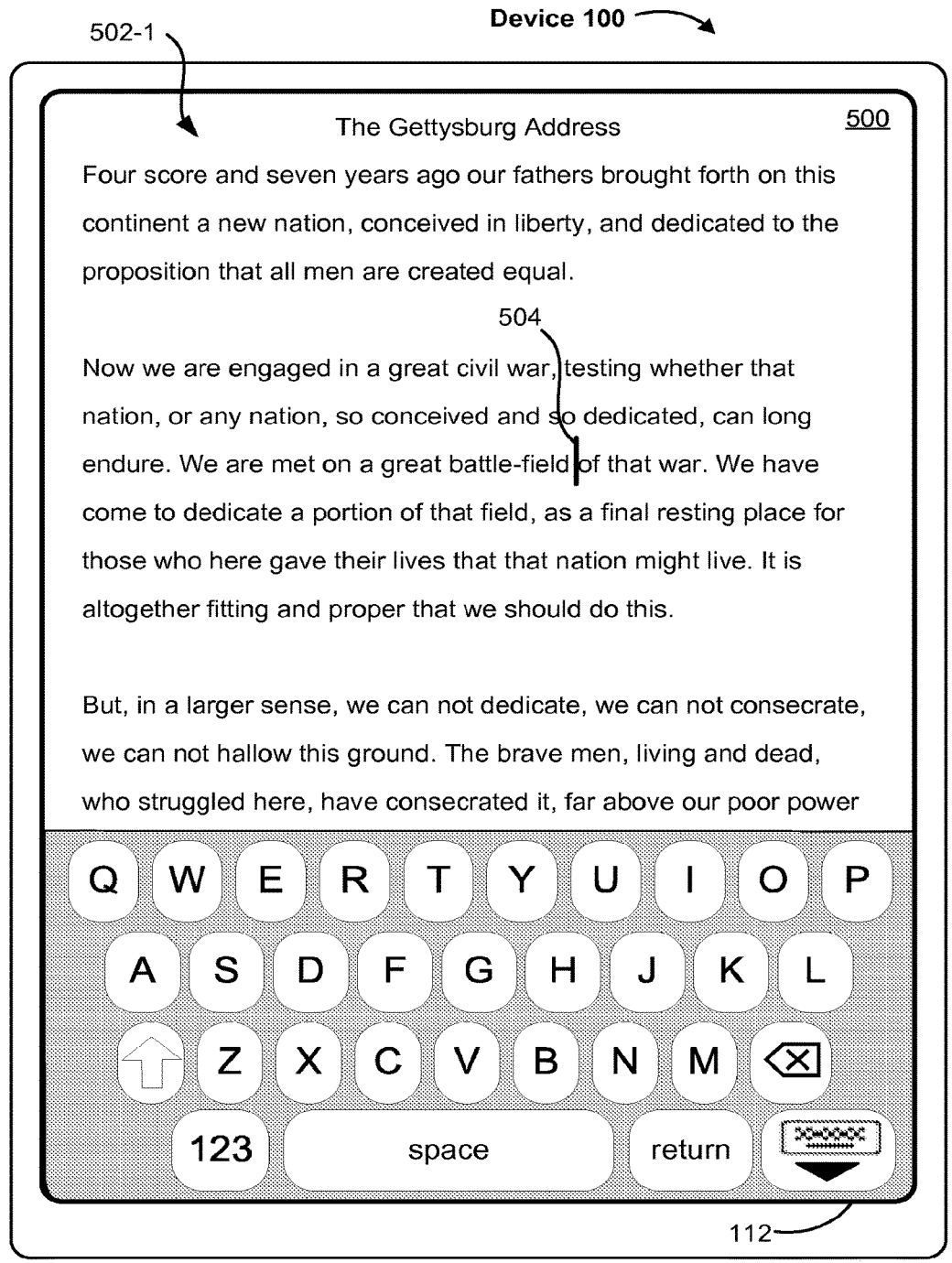

In response to the detection of gesture 522, insertion marker 504 is moved from Position 1 by one word rightward (i.e., in accordance with the direction of movement 524 of gesture 522) to a position just before the word "of" in the sentence "We are met on a great battle-field of that war." as shown in FIG. 5G. For ease of explanation, this new position is referred to below as "Position 4."

In some embodiments, movement by "one word" from a current position in a current word (e.g., a position at the beginning of the current word, after a space and before the first character in the current word; a position between characters in the middle of the current word; or a position at the end of the current word, after the last character in the current word and prior to a space) includes movement to the beginning of the next word after the current word (e.g., for a rightward horizontal gesture). In some embodiments, movement by "one word" from a current position in a current word includes (a) movement to the beginning of the current word if the current position is in the middle of the current word or at the end of the current word, and (b) movement to the beginning of the word immediately before the current word if the current position is at the beginning of the current word (e.g., for a leftward horizontal gesture). In some other embodiments, movement by "one word" from a current position in a current word includes movement to the beginning of the word immediately before the current word if the current position is at the beginning, middle, or end of the current word (e.g., for a leftward horizontal gesture).

In some embodiments, movement of insertion marker 504 by one word in response to the detection of gesture 522 is in response to a determination that gesture 522 satisfies one or more particular predefined conditions. In some embodiments, the one or more predefined conditions include a condition that the detected gesture be a multi-finger gesture (e.g., two-finger or three-finger gesture). In some embodiments, the multi-finger gesture condition requires that the detected gesture be a two-finger gesture (which is satisfied by gesture 522).

Figure 5H:
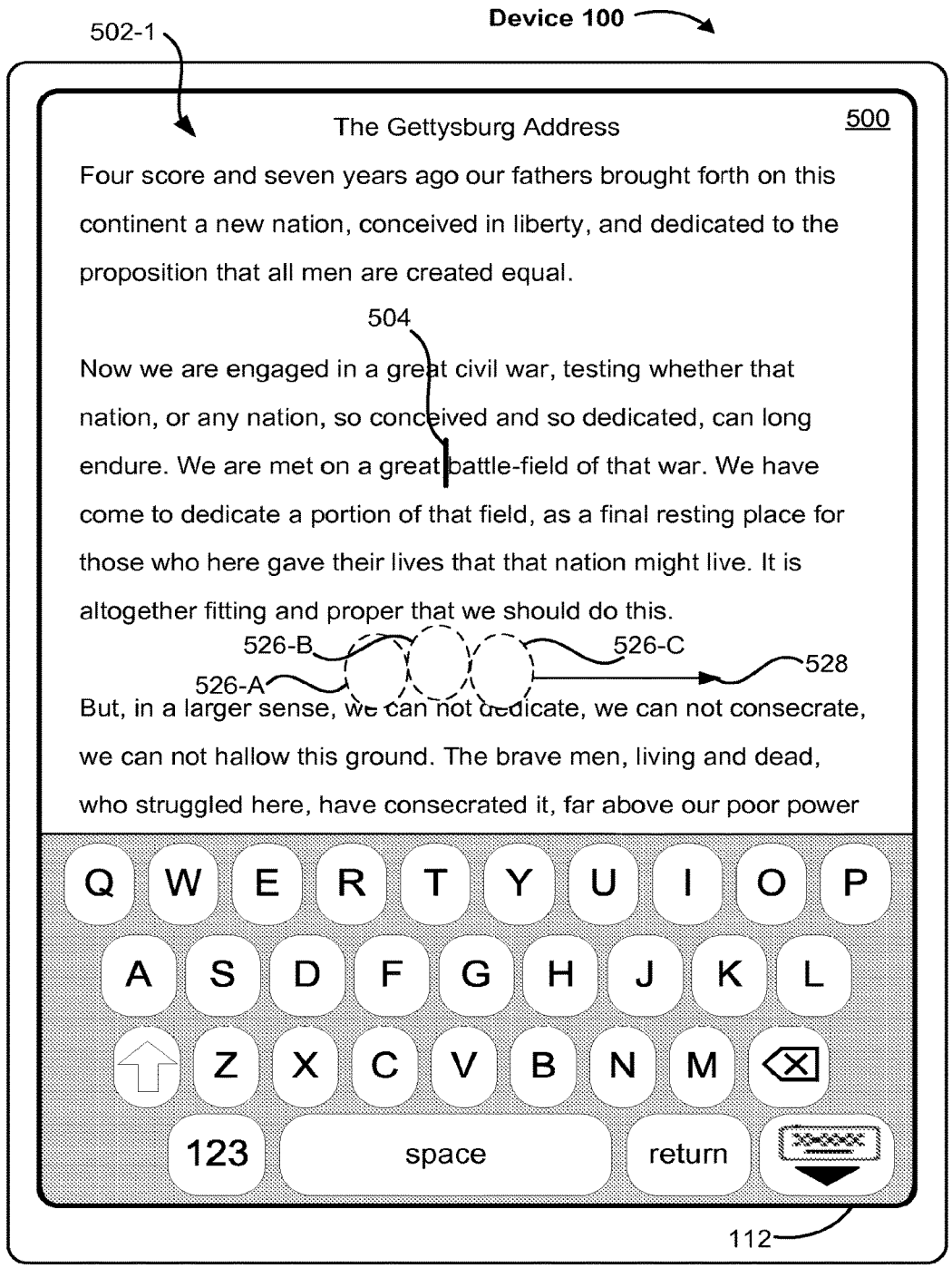

FIG. 5H illustrates gesture 526 detected on touch screen 112. Gesture 526 is a three-finger gesture; gesture 526 includes finger contacts 526-A, 526-B, and 526-C, and movement 528 of finger contacts 526-A thru 526-C. Movement 528 is horizontal or substantially horizontal, and rightward.

Figure 5I:
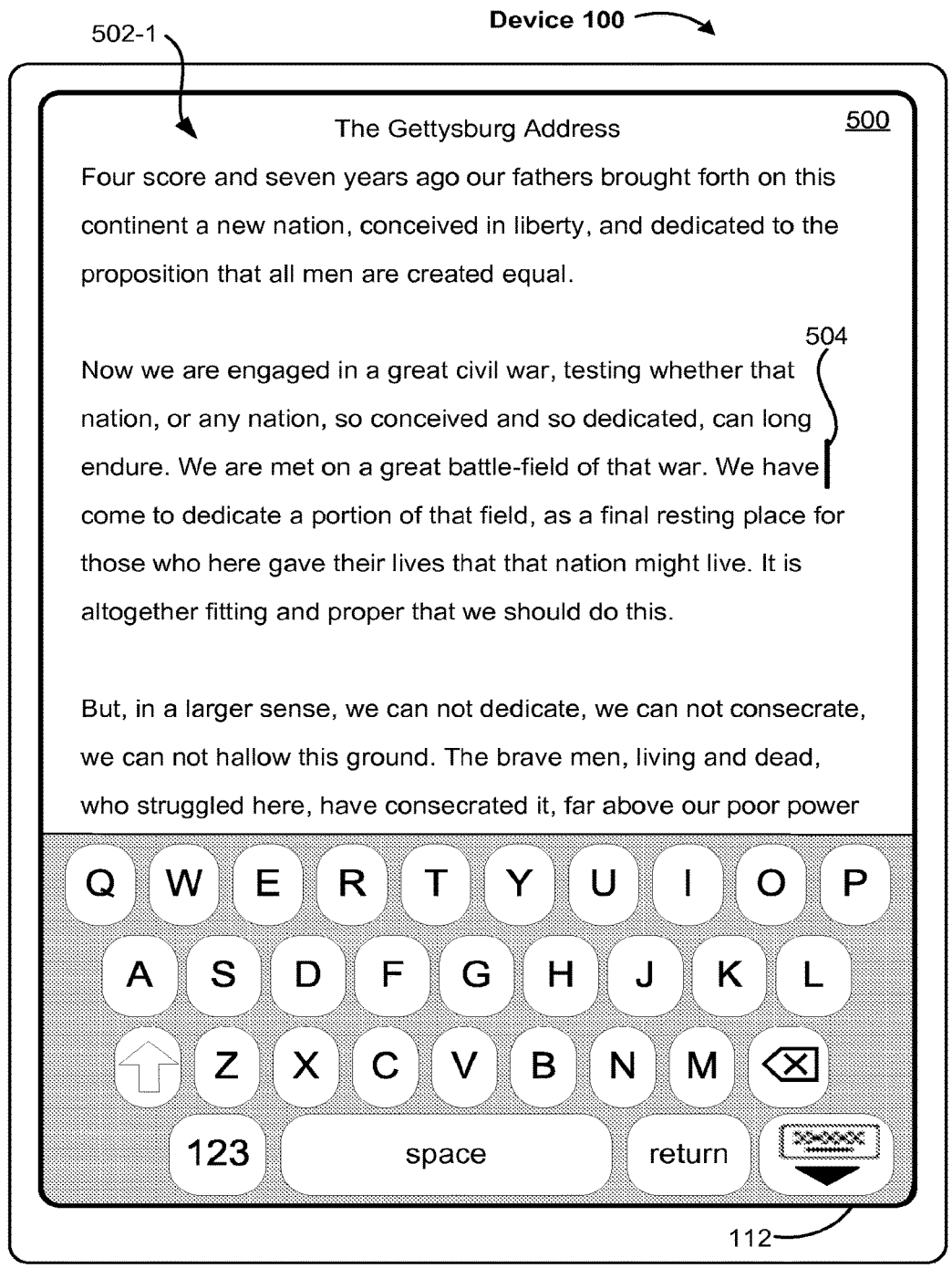

In some embodiments, in response to the detection of gesture 526, insertion marker 504 is moved from Position 1 to the end of the line of text in which Position 1 is located, in accordance with the direction of movement 528 of gesture 526, as shown in FIG. 5I. For ease of explanation, this new position is referred to below as "Position 5."

Figure 5J:
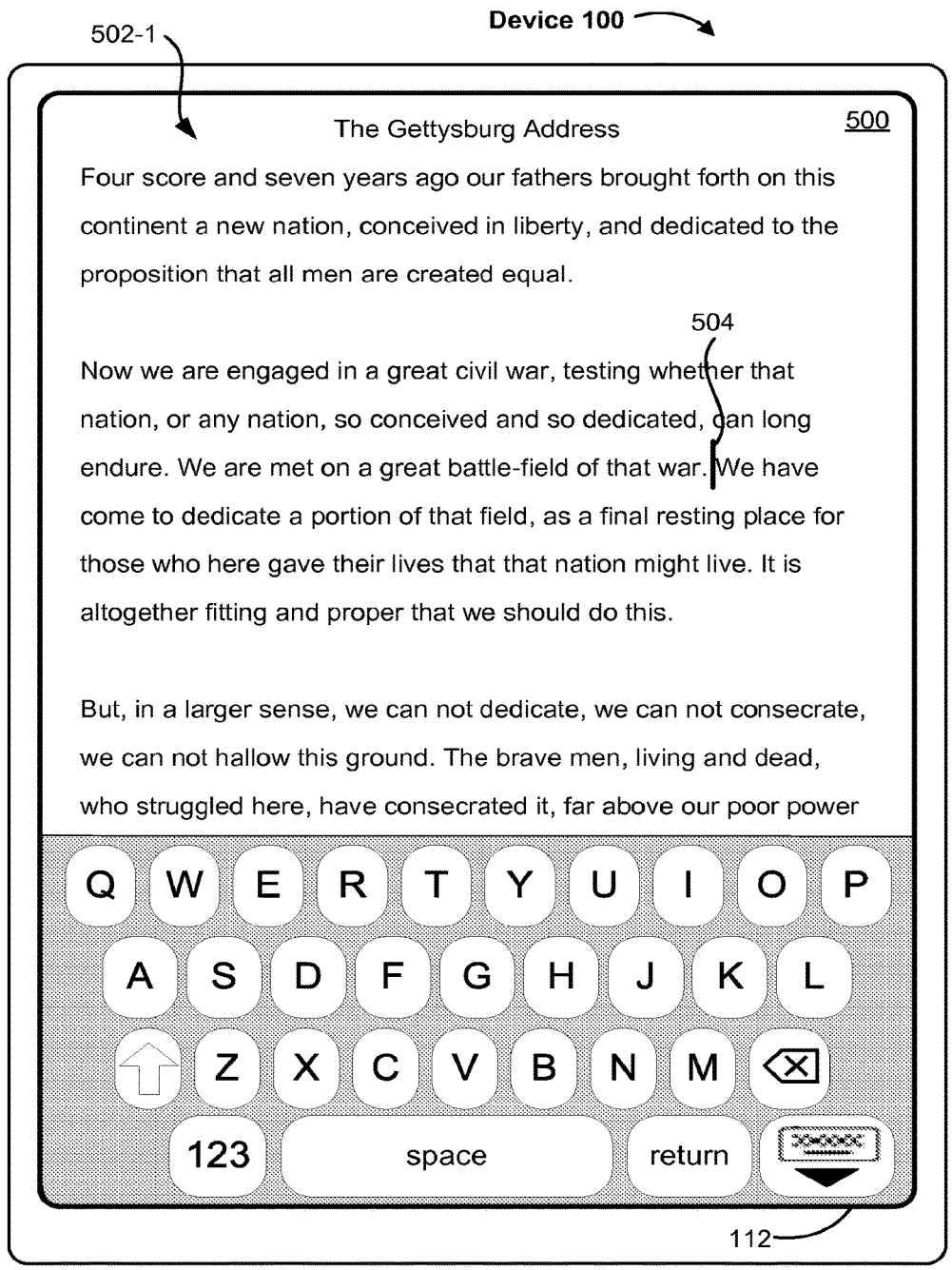

In some other embodiments, in response to the detection of gesture 526, insertion marker 504 is moved from Position 1 to the beginning of the sentence "We have come to dedicate a portion . . . ", which is the sentence following the sentence "We are met on a great battle-field of that war." in which Position 1 is located, as shown in FIG. 5J. The movement of insertion marker 504 is in accordance with the direction of movement 528 of gesture 526. For ease of explanation, the new position of insertion marker 504 as shown in FIG. 5J is referred to below as "Position 6."

In some embodiments, movement of insertion marker 504 to the end of the line (or, in some other embodiments, to the beginning of the next sentence) in response to the detection of gesture 526 is in response to a determination that gesture 526 satisfies one or more particular predefined conditions. In some embodiments, the one or more predefined conditions include a condition that the detected gesture be a multi-finger gesture (e.g., two-finger or three-finger gesture). In some embodiments, the multi-finger gesture condition requires that the detected gesture be a three-finger gesture (which is satisfied by gesture 526).

Figure 5K:
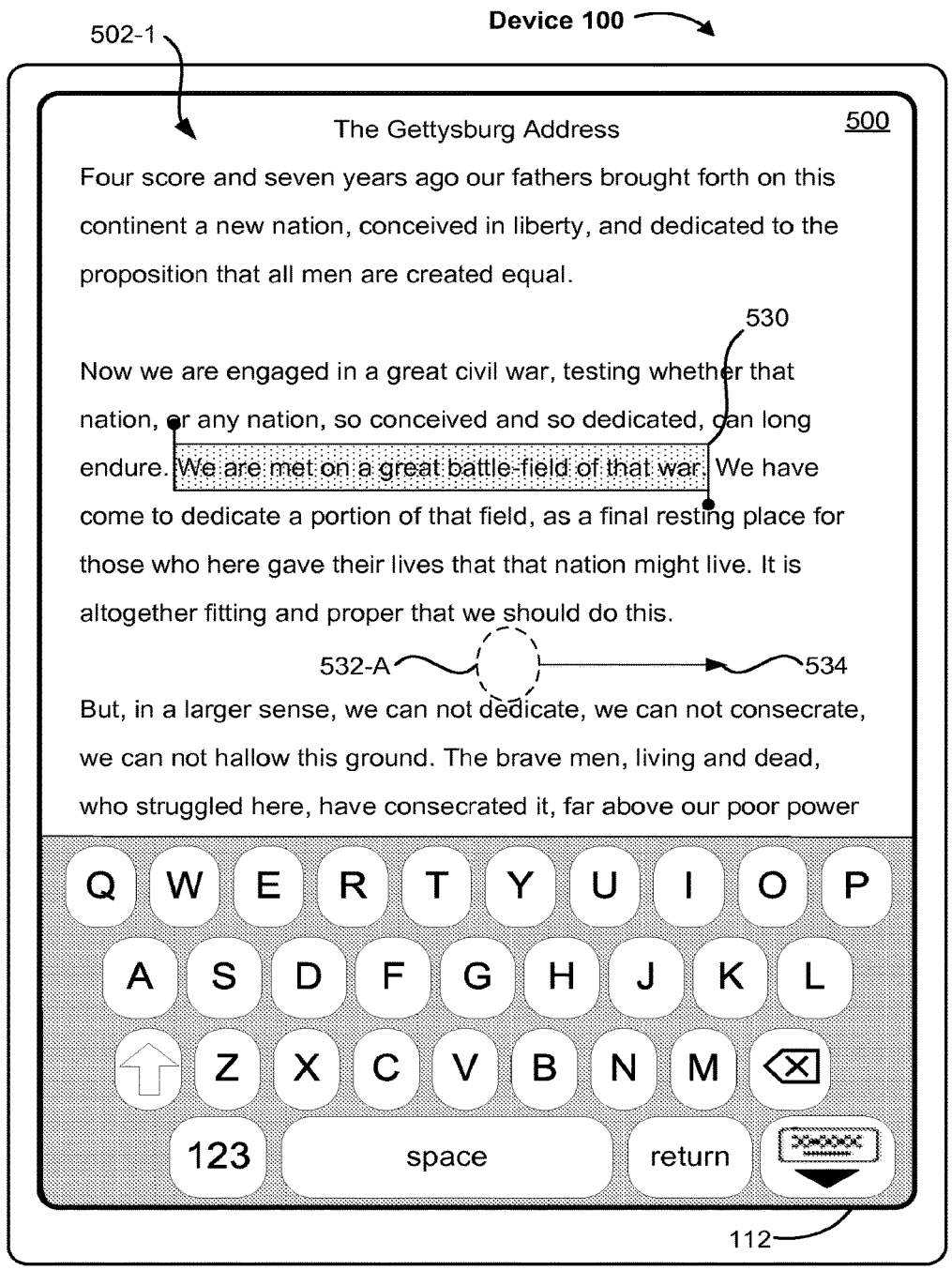

FIG. 5K illustrates text 502-1 displayed on touch screen 112 with selection range 530 over a portion of text 502-1. Selection range 530 selects the sentence "We are met on a great battle-field of that war.", starting from just before the letter "W" in the word "We" and ending just after the period ending the sentence. In some embodiments, when selection range 530 is displayed, insertion marker 504 is not displayed, as is the case illustrated in FIG. 5K.

FIG. 5K also illustrates gesture 532 detected on touch screen 112. Gesture 532 includes contact 532-A and movement 534 of contact 532-A. Movement 534 is horizontal or substantially horizontal, and rightward.

Figure 5L:
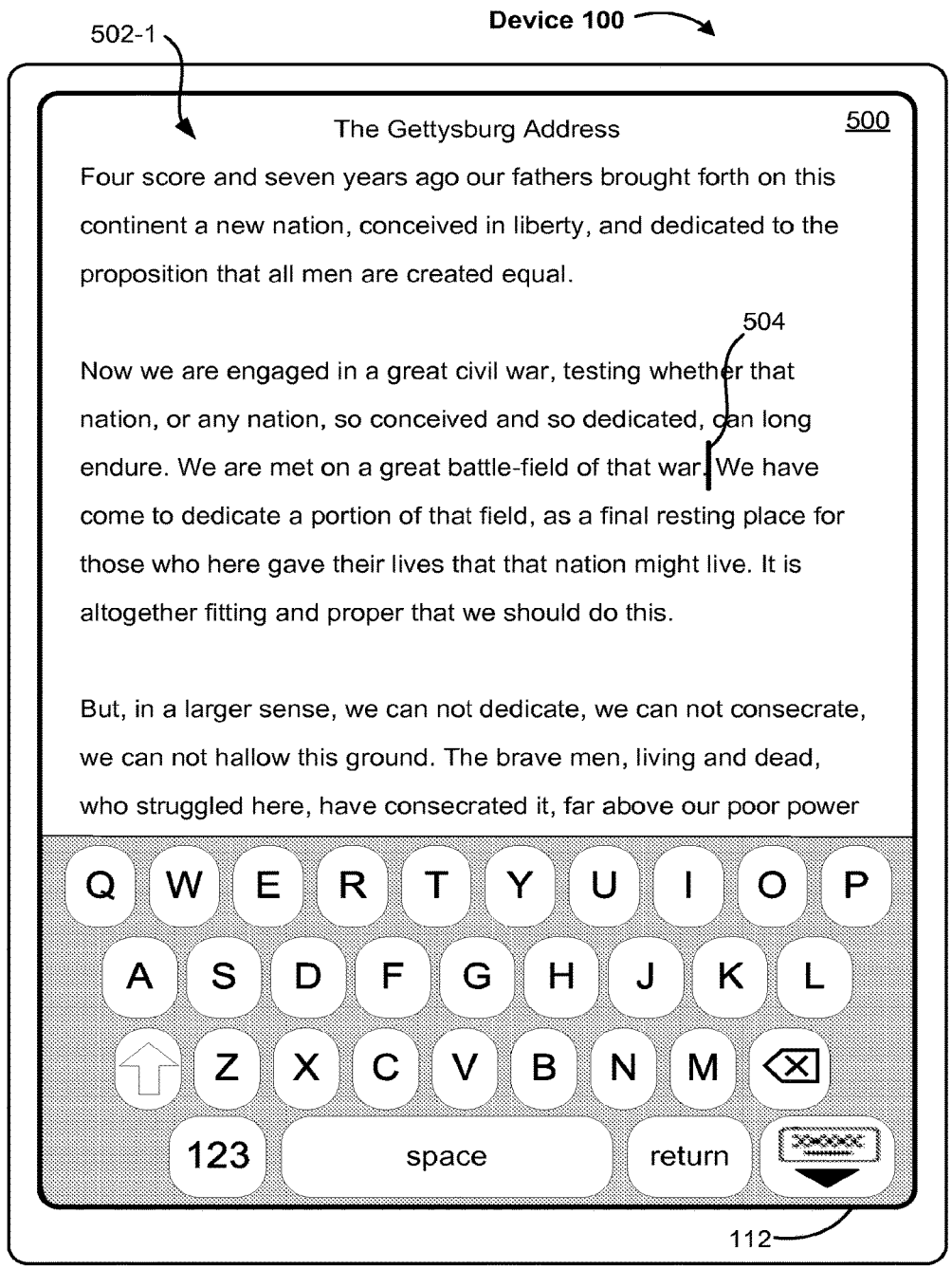

In response to the detection of gesture 532, insertion marker 504 is placed at a position corresponding to the end of selection range 530 (in accordance with the direction of movement 534 of gesture 532), just after the period ending the sentence "We are met on a great battle-field of that war.", as shown in FIG. 5L. This position is referred to below as "Position 7." Also in response to the detection of gesture 532, the text selected by selection range 530 is deselected (and selection range 530 ceases to be displayed).

In some embodiments, placement of insertion marker 504 at the end of selection range 530 in response to the detection of gesture 532 is in response to a determination that gesture 532 satisfies one or more particular predefined conditions. In some embodiments, the one or more predefined conditions include a condition that the detected gesture be a single-finger gesture (which is satisfied by gesture 532).

Figure 5M:
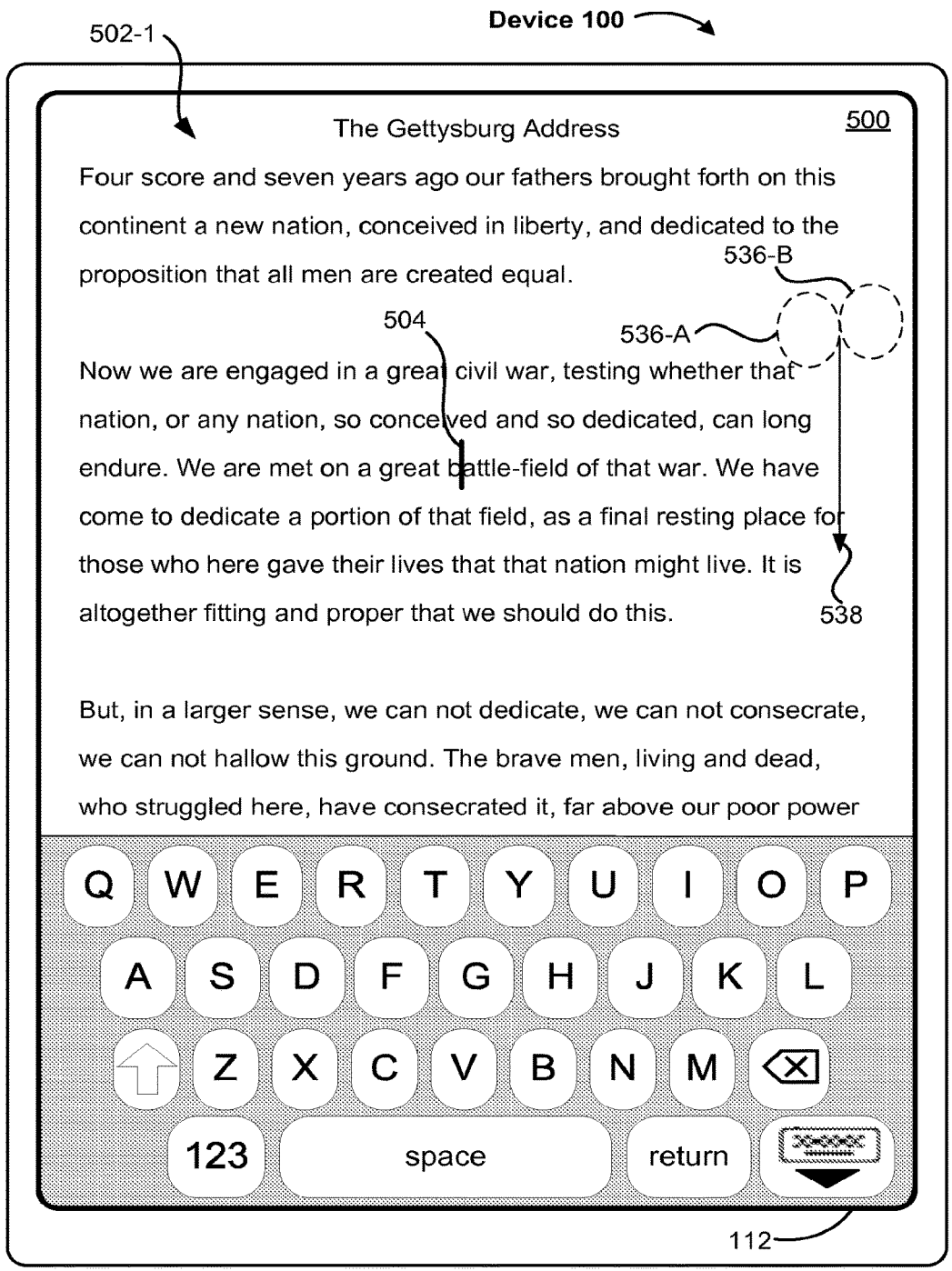

FIG. 5M illustrates gesture 536 detected on touch screen 112 while insertion marker 504 is displayed at Position 2 in text 502-1. Gesture 536 includes contacts 536-A and 536-B, and movement 538 of the contacts 536-A and 536-B. Movement 538 is vertical or substantially vertical, and downward.

Figure 5N:
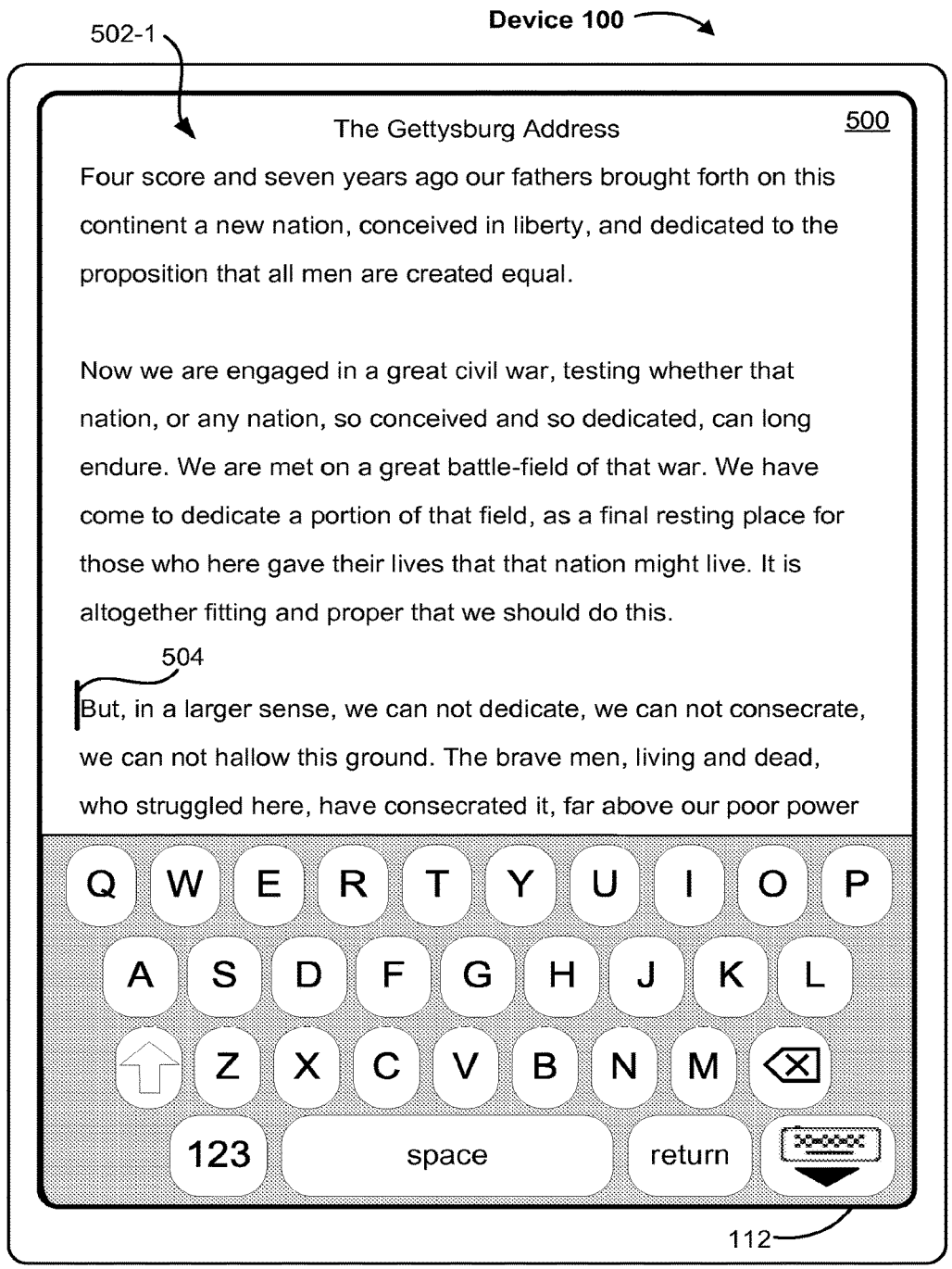

In response to the detection of gesture 536, insertion marker 504 is placed at a position corresponding to the beginning of the paragraph subsequent to the paragraph in which Position 2 is located, as shown in FIG. 5N. The new position, referred to below as "Position 8," is downward from Position 2 in text 502-1; insertion marker 504 moves from Position 2 to Position 8 in accordance with the downward direction of movement 538.

In some embodiments, movement of insertion marker 504 from Position 2 to Position 8 in response to the detection of gesture 536 is in response to a determination that gesture 536 satisfies one or more particular predefined conditions. In some embodiments, the one or more predefined conditions include a condition that the detected gesture be a multi-finger gesture. In some embodiments, the condition is that the detected gesture be a two-finger gesture (which is satisfied by gesture 536).

Figure 5O:
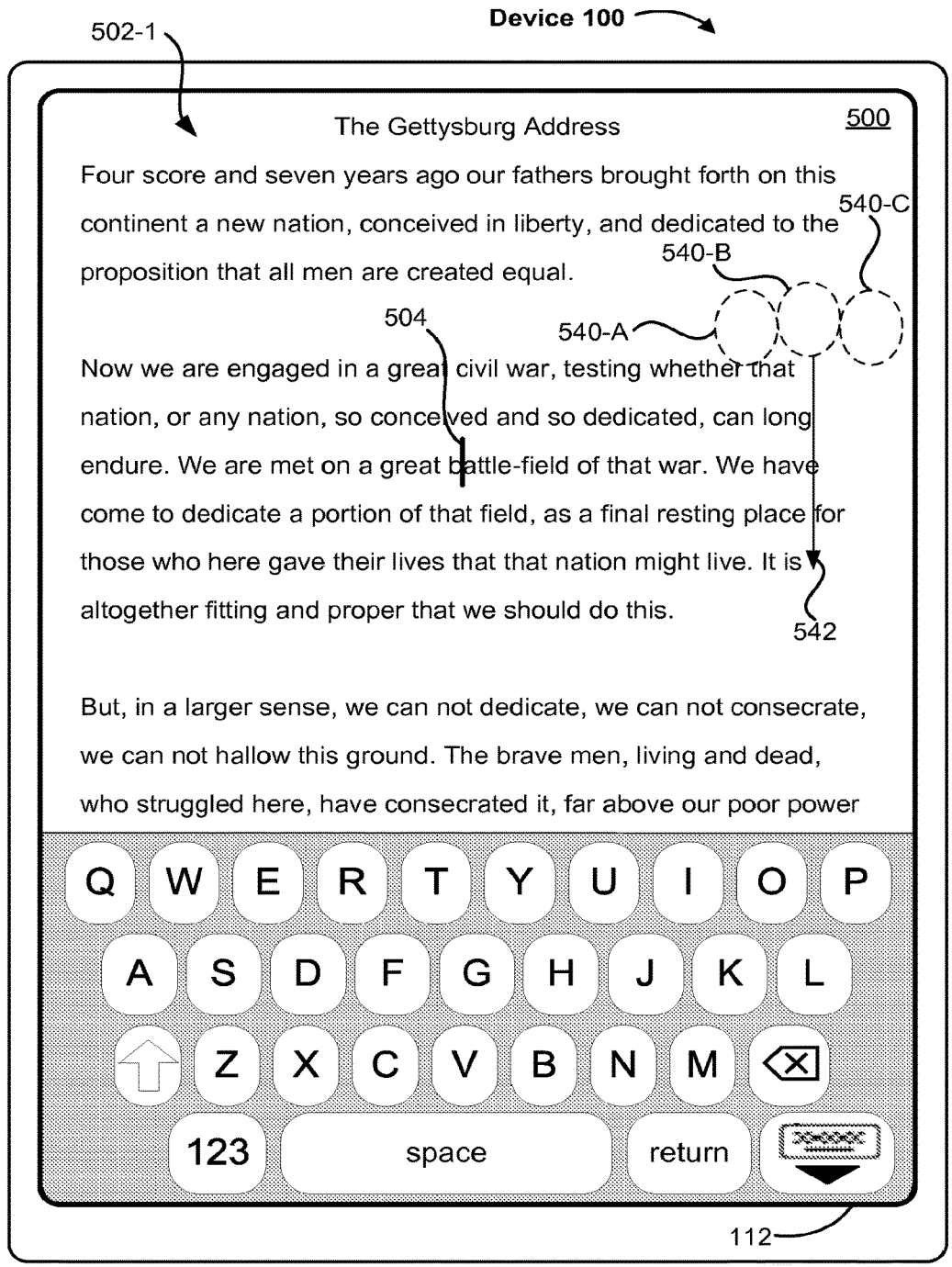
Figure 5P:
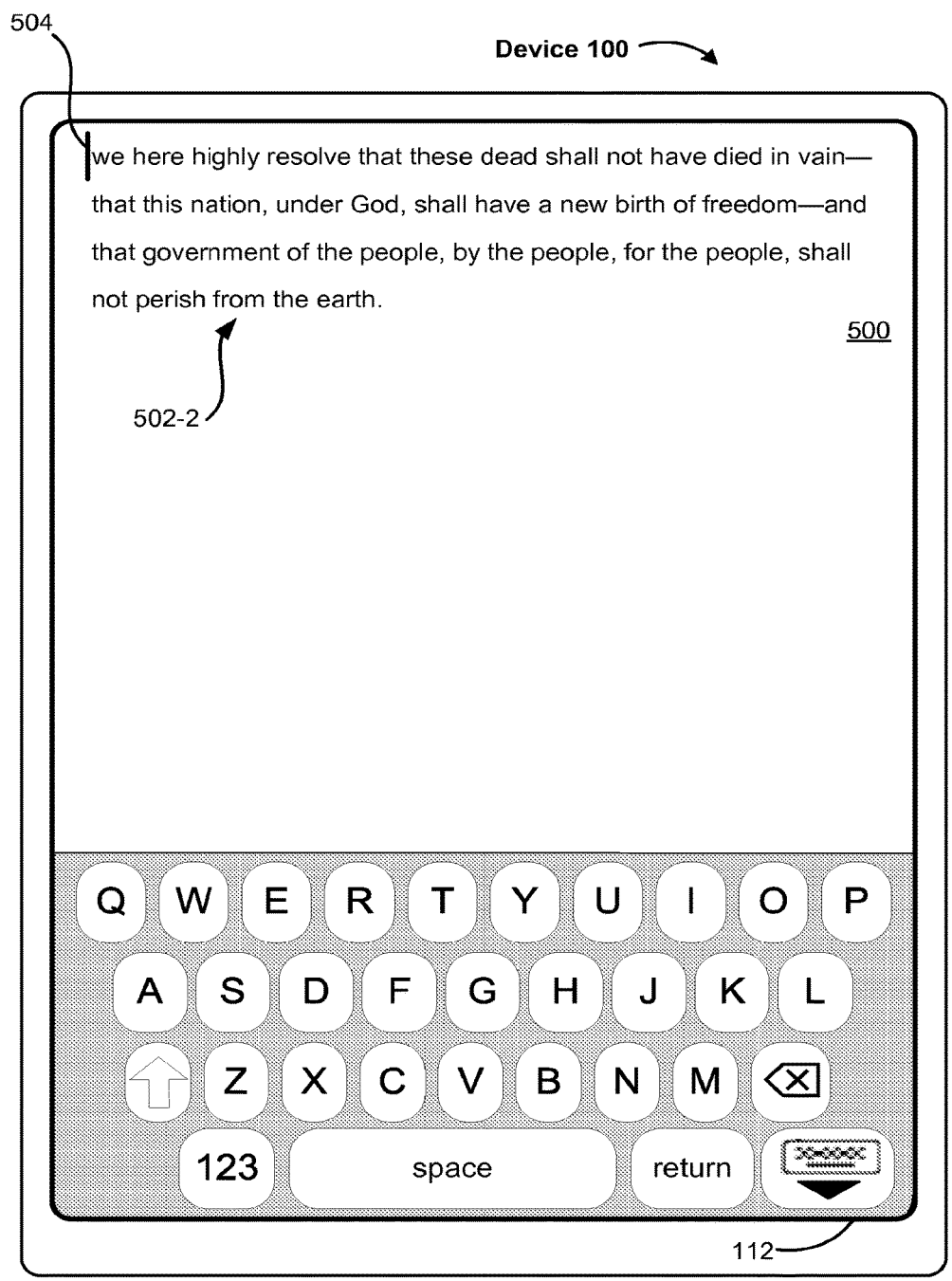
Figure 6A:
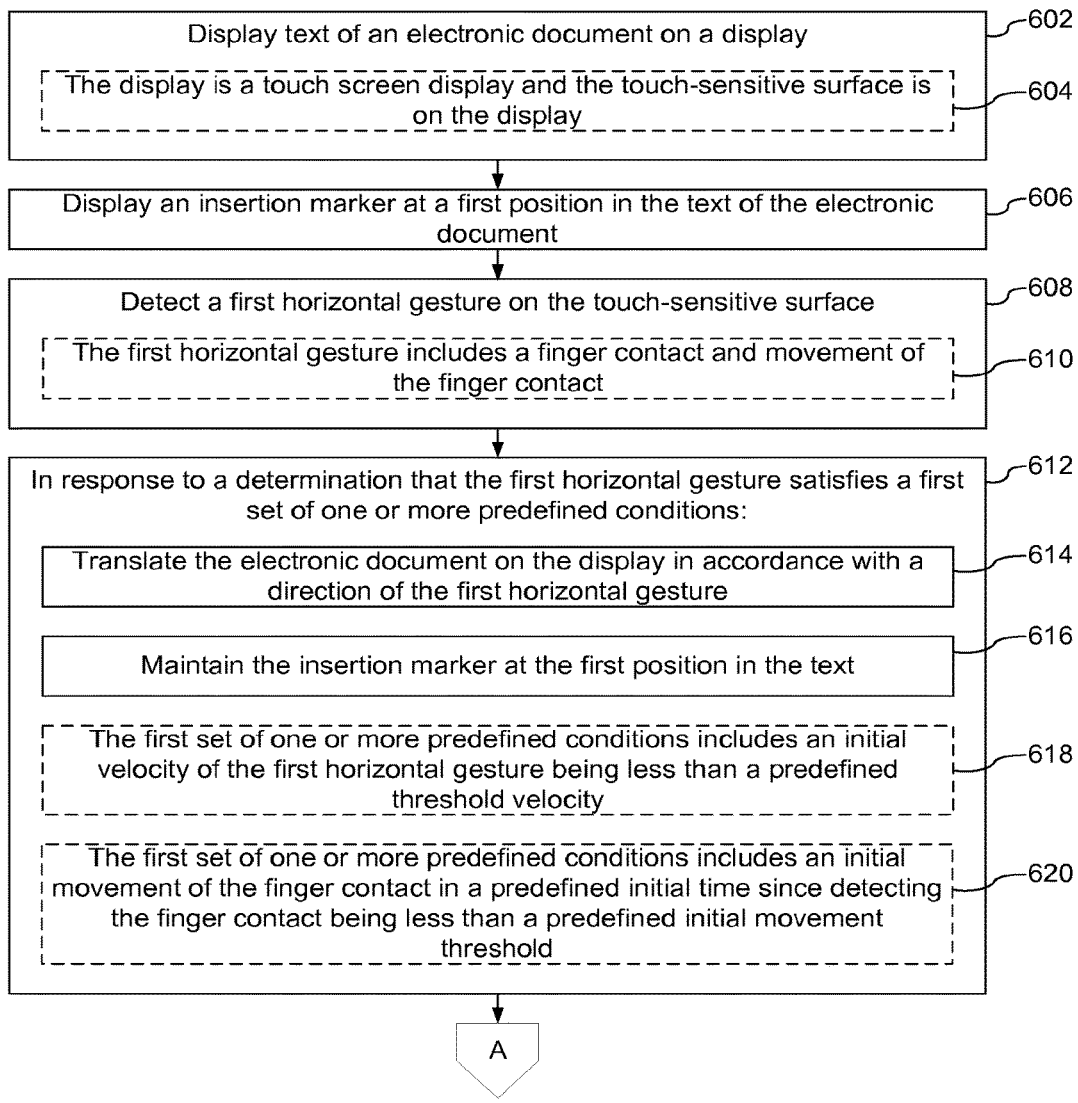
FIGS. 6A-6F are flow diagrams illustrating a method of navigating and editing text via a touch-sensitive surface in accordance with some embodiments.
Figure 6B:
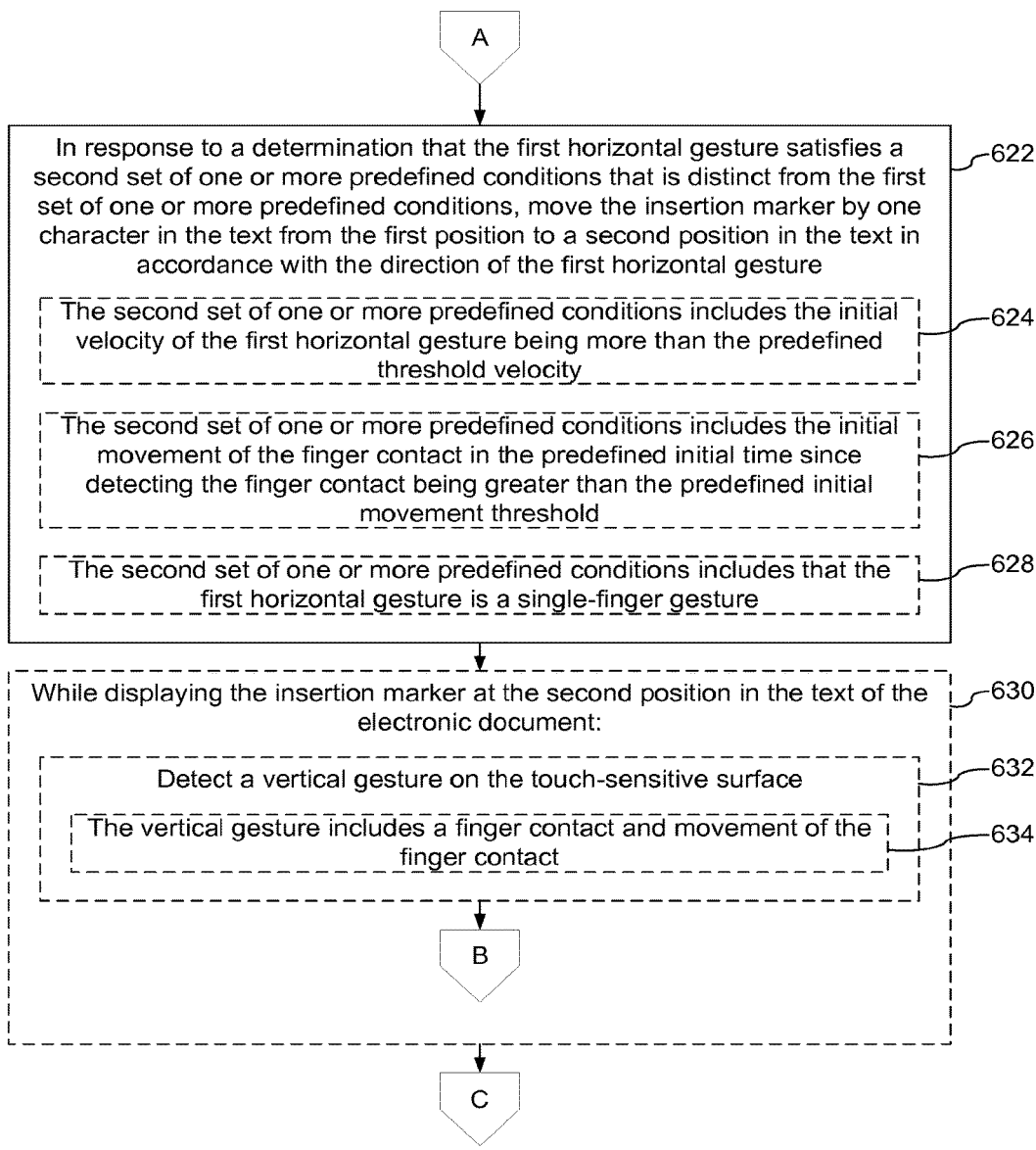
Figure 6C:
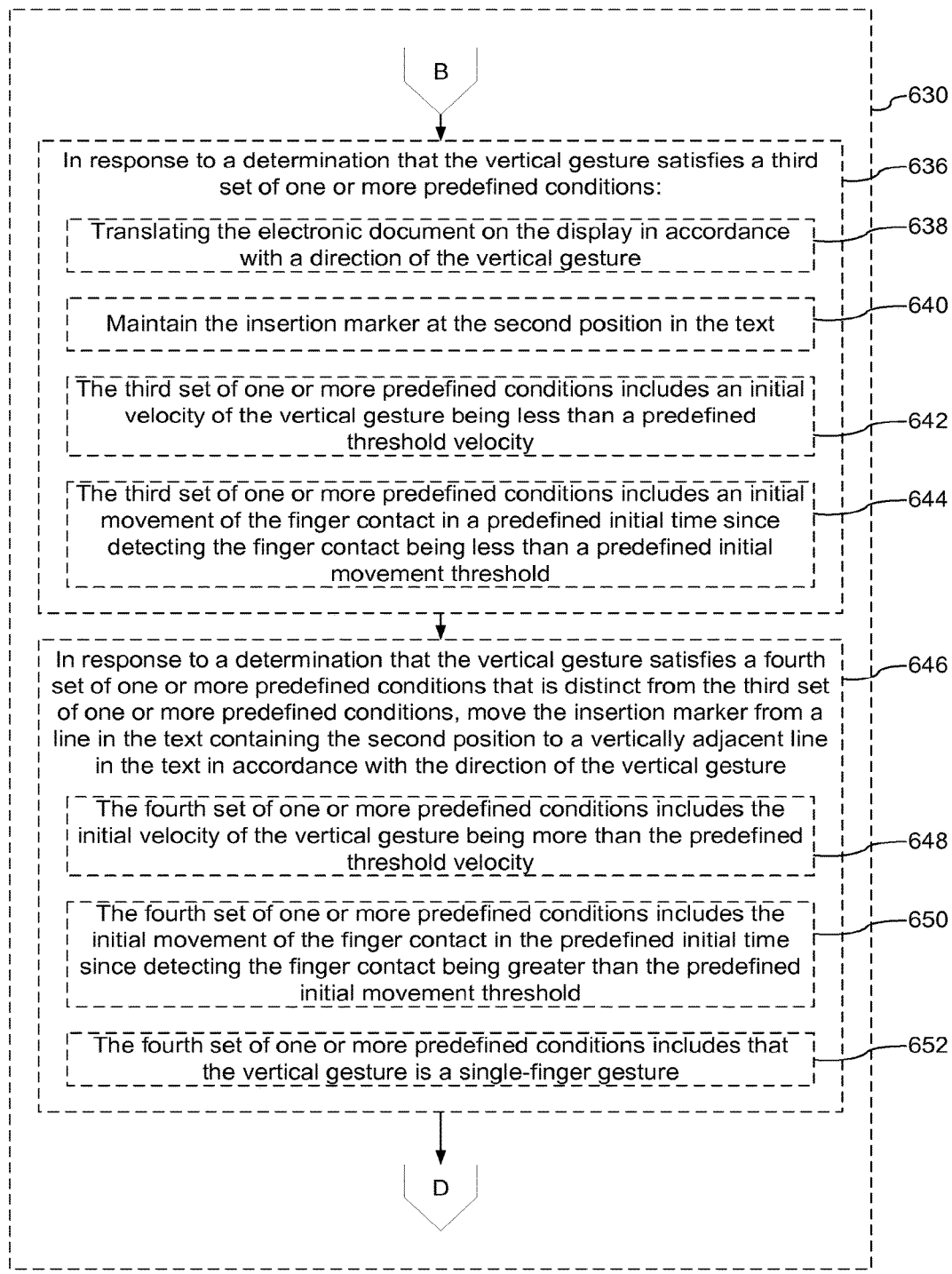
Figure 6D:
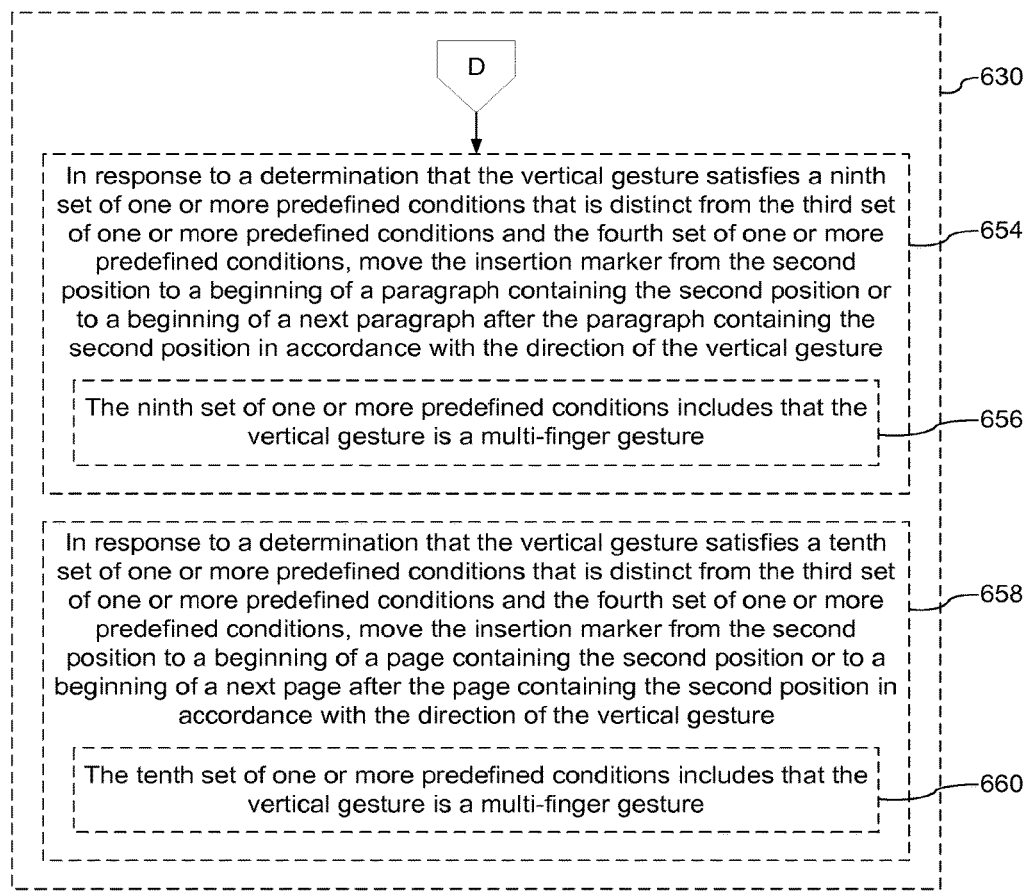
Figure 6E:
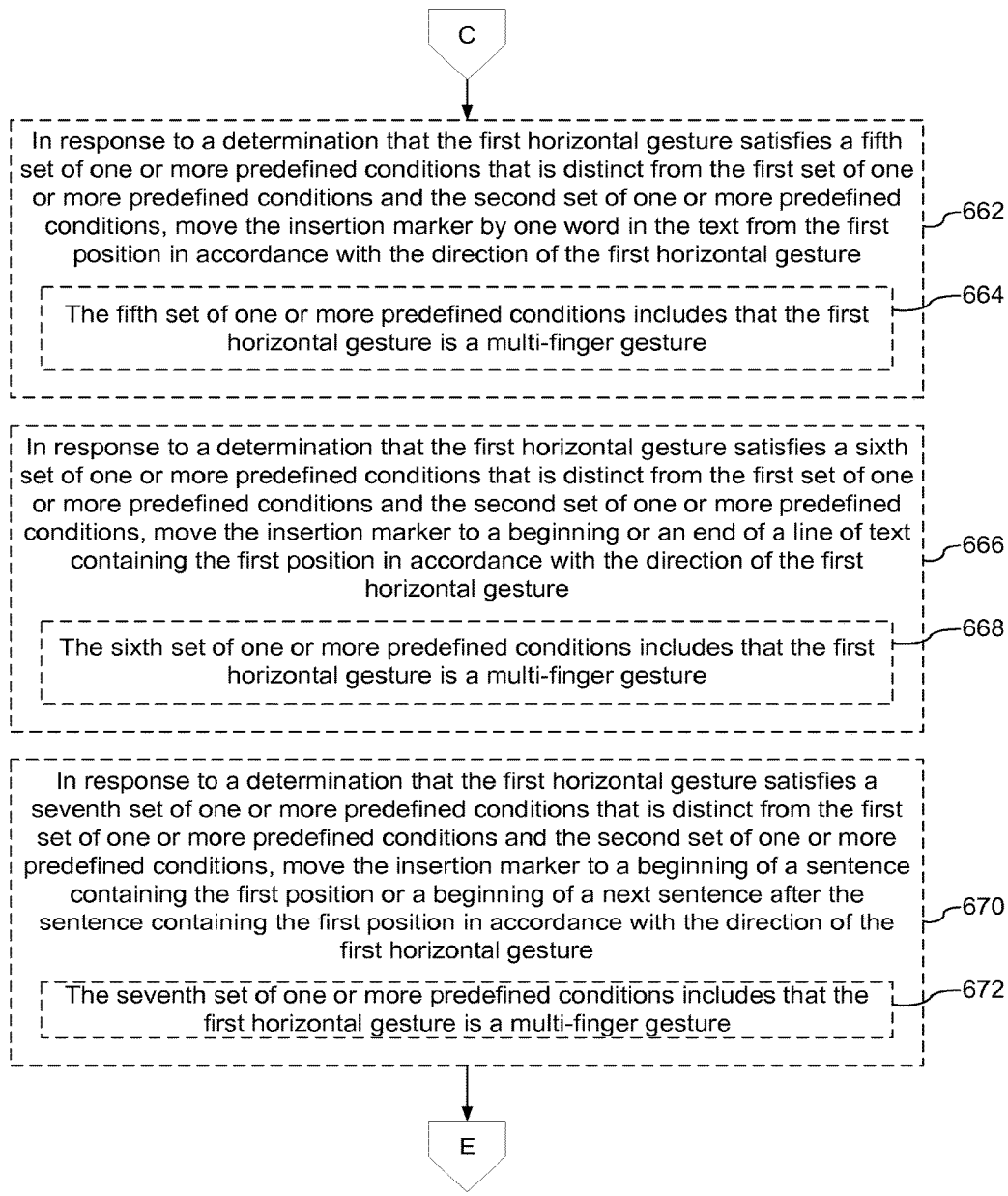
Figure 6F:
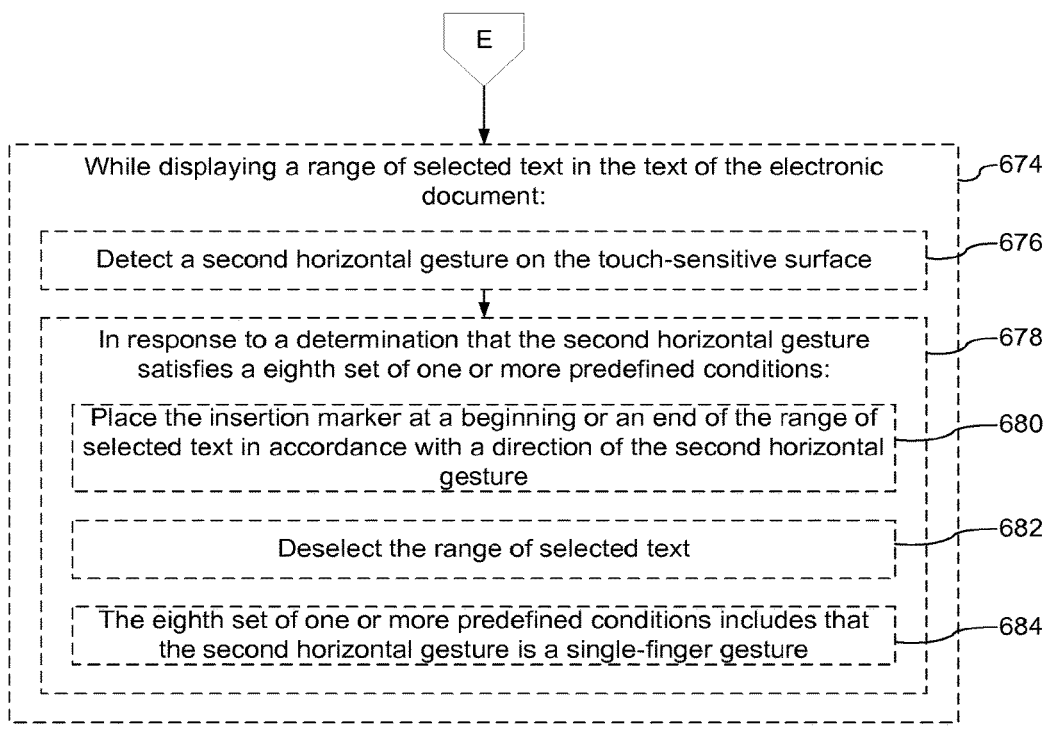

FIG. 5O illustrates gesture 540 detected on touch screen 112 while insertion marker 504 is displayed at Position 2 in text 502-1. Gesture 540 includes contacts 540-A, 540-B, and 540-C, and movement 542 of the contacts 540-A thru 540-C. Movement 542 is vertical or substantially vertical, and downward.

In response to the detection of gesture 540, insertion marker 504 is placed at a position corresponding to the beginning of the text 502-2 in a page subsequent to the page containing text 502-1, in which Position 2 is located, as shown in FIG. 5P. The new position, referred to below as "Position 9," is downward from Position 2 in text 502-1 in the sense that Position 9 comes after Position 2 in text 502; insertion marker 504 moves from Position 2 to Position 9 in accordance with the downward direction of movement 542.

In some embodiments, movement of insertion marker 504 from Position 2 to Position 9 in response to the detection of gesture 540 is in response to a determination that gesture 540 satisfies one or more particular predefined conditions. In some embodiments, the one or more predefined conditions include a condition that the detected gesture be a multi-finger gesture. In some embodiments, the condition is that the detected gesture be a three-finger gesture (which is satisfied by gesture 540).

It should be appreciated that the gestures described above with reference to FIGS. 5A-5P may be performed and repeated in any suitable sequence to move insertion marker 504 or translate the document by any desired amount.

FIGS. 6A-6F are flow diagrams illustrating a method 600 of navigating and editing text via a touch-sensitive surface in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to position an insertion marker within a document. Fast imprecise finger swipe gestures are used to precisely move an insertion marker by a desired amount, while slower, more deliberate gestures are used to navigate (e.g., scroll or translate) the document. The method reduces the cognitive burden on a user when navigating and editing text via a touch-sensitive surface, thereby creating a more efficient human-machine interface. For battery-operated electronic devices, enabling a user to position an insertion marker within text faster and more efficiently conserves power and increases the time between battery charges.

The device displays text of an electronic document on the display (602). For example, in FIG. 5A, text 502-1 of electronic document 500 is displayed on touch screen 112. In some embodiments, the display is a touch screen display and the touch-sensitive surface is on the display (604).

The device displays an insertion marker (e.g., an I-beam, underline, rectangle, or other text cursor) at a first position in the text of the electronic document (e.g., in an editing mode for the electronic document) (606). For example, in FIG. 5A, insertion marker 504 is displayed at Position 1 in text 502-1.

The device detects a first horizontal (or substantially horizontal, e.g., within 10, 20, or 30 degrees of horizontal) gesture on the touch-sensitive surface (608). In FIG. 5A, for example, gesture 506 is detected on touch screen 112. Gesture 506 has movement 508 that is horizontal.

In response to a determination that the first horizontal gesture satisfies a first set of one or more predefined conditions (612), the device translates (e.g., panning or scrolling) the electronic document on the display in accordance with a direction of the first horizontal gesture (614) and maintains the insertion marker at the first position in the text (616). For example, if device 100 determines that gesture 506 satisfies a first set of one or more predefined conditions, in response to the determination, document 500, including text 502-1 is panned in direction 512 (which is in accord with the direction of movement 508, as shown in FIG. 5B. Throughout the panning of document 500, insertion marker 504 is maintained at Position 1 within text 502-1, as shown in FIG. 5B.

In response to a determination that the first horizontal gesture satisfies a second set of one or more predefined conditions that is distinct from the first set of one or more predefined conditions, the device moves the insertion marker by one character in the text from the first position to a second position in the text in accordance with the direction of the first horizontal gesture (622). For example, if device 100 determines that gesture 506 satisfies a second set of one or more predefined conditions that is distinct from the first set of predefined conditions, in response to the determination, insertion marker 504 is moved from Position 1 in FIG. 5A to Position 2 in FIG. 5C. Position 2 is one character forward in text 502-1 from Position 1, which is in accord with the direction of movement 508, as the direction of movement 508 points in the forward direction with respect to text 502-1.

In some embodiments, the first set of one or more predefined conditions includes an initial velocity of the first horizontal gesture being less than a predefined threshold velocity (e.g., 250, 333, or 500 points/sec) (618), and the second set of one or more predefined conditions includes the initial velocity of the first horizontal gesture being more than the predefined threshold velocity (624). For example, device 100 detects an initial velocity of gesture 506. If the initial velocity of gesture 506 is less than a predefined threshold velocity, then document 500 is panned and insertion marker 504 remains at Position 1, as shown in FIG. 5B. If the initial velocity of gesture 506 is more than the predefined threshold velocity, then insertion marker 504 is moved to Position 2, as shown in FIG. 5C.

In some embodiments, the first horizontal gesture includes a finger contact and movement of the finger contact (610), the first set of one or more predefined conditions includes an initial movement of the finger contact (e.g., movement by 25, 50, or 75 points, where 1 point=1/72 inches) in a predefined initial time since detecting the finger contact (e.g., 0.05, 0.10, 0.15, 0.20, or 0.25 seconds) being less than a predefined initial movement threshold (620), and the second set of one or more predefined conditions includes the initial movement of the finger contact in the predefined initial time since detecting the finger contact being greater than the predefined initial movement threshold (626). For example, gesture 506 includes contact 506-A and movement 508 of contact 506-A. If contact 506-A moves, in a predefined initial time since detection of contact 506-A, a distance less than a predefined initial movement threshold, then document 500 is panned and insertion marker 504 remains at Position 1, as shown in FIG. 5B. If contact 506-A moves, in the predefined initial time since detection of contact 506-A, a distance more than the predefined initial movement threshold, then insertion marker 504 is moved to Position 2, as shown in FIG. 5C.

In some embodiments, the second set of one or more predefined conditions includes that the first horizontal gesture is a single-finger gesture (628). For example, in FIG. 5C, insertion marker 504 moves from Position 1 to Position 2 in response to a single-finger (i.e., one finger contact 506-A) gesture 506. Thus, in some embodiments, a quick, horizontal swipe gesture with a single finger moves the insertion marker by one character in the direction of the gesture, while a slower horizontal gesture with a single finger translates the document in the direction of the gesture. In some embodiments, if a multi-finger gesture with horizontal movement is detected instead of gesture 506, other operations may be performed or gesture 506 may be ignored.

In some embodiments, while displaying the insertion marker at the second position in the text of the electronic document (630), the device detects a vertical (or substantially vertical, e.g., within 10, 20, or 30 degrees of vertical) gesture on the touch-sensitive surface (630). For example, in FIG. 5C, while insertion marker 504 is displayed at Position 2, gesture 514 is detected on touch screen 112. Gesture 514 includes downward vertical movement 516.

In response to a determination that the vertical gesture satisfies a third set of one or more predefined conditions (636), the device translates (e.g., scrolls) the electronic document on the display in accordance with a direction of the vertical gesture (638) and maintains the insertion marker at the second position in the text (640). For example, if device 100 determines that gesture 514 satisfies a third set of one or more predefined conditions, in response to the determination, document 500, including text 502-1 is scrolled in direction 520 (which is in accord with the direction of movement 516, as shown in FIG. 5D. Throughout the scrolling of document 500, insertion marker 504 is maintained at Position 2 within text 502-1, as shown in FIG. 5D.

In response to a determination that the vertical gesture satisfies a fourth set of one or more predefined conditions that is distinct from the third set of one or more predefined conditions, the device moves the insertion marker from a line in the text containing the second position to a vertically adjacent line in the text in accordance with the direction of the vertical gesture (646). For example, if device 100 determines that gesture 514 satisfies a fourth set of one or more predefined conditions that is distinct from the third set of predefined conditions, in response to the determination, insertion marker 504 is moved from Position 2 in FIG. 5C to Position 3 in FIG. 5E. Position 3 is one line downward in text 502-1 from Position 2, which is in accord with the downward direction of movement 516.

In some embodiments, the third set of one or more predefined conditions includes an initial velocity of the vertical gesture being less than a predefined threshold velocity (e.g., 250, 333, or 500 points/sec) (642), and the fourth set of one or more predefined conditions includes the initial velocity of the vertical gesture being more than the predefined threshold velocity (648). For example, device 100 detects an initial velocity of gesture 514. If the initial velocity of gesture 514 is less than a predefined threshold velocity, then document 500 is scrolled and insertion marker 504 remains at Position 2, as shown in FIG. 5D. If the initial velocity of gesture 514 is more than the predefined threshold velocity, then insertion marker 504 is moved to Position 3, as shown in FIG. 5E.

In some embodiments, the vertical gesture includes a finger contact and movement of the finger contact (634), the third set of one or more predefined conditions includes an initial movement of the finger contact (e.g., movement by 25, 50, or 75 points, where 1 point=1/72 inches) in a predefined initial time since detecting the finger contact (e.g., 0.05, 0.10, 0.15, 0.20, or 0.25 seconds) being less than a predefined initial movement threshold (644), and the fourth set of one or more predefined conditions includes the initial movement of the finger contact in the predefined initial time since detecting the finger contact being greater than the predefined initial movement threshold (650). For example, gesture 514 (FIG. 5C) includes contact 514-A and movement 516 of contact 514-A. If contact 514-A moves, in a predefined initial time since detection of contact 514-A, a distance less than a predefined initial movement threshold, then document 500 is scrolled and insertion marker 504 remains at Position 2, as shown in FIG. 5D. If contact 514-A moves, in the predefined initial time since detection of contact 514-A, a distance more than the predefined initial movement threshold, then insertion marker 504 is moved to Position 3, as shown in FIG. 5E.

In some embodiments, the fourth set of one or more predefined conditions includes that the vertical gesture is a single-finger gesture (652). For example, in FIG. 5E, insertion marker 504 moves from Position 2 to Position 3 in response to a single-finger (i.e., one finger contact 514-A) gesture 514. Thus, in some embodiments, a quick, vertical swipe gesture with a single finger moves the insertion marker by one line in the direction of the gesture, while a slower vertical gesture with a single finger translates the document in the direction of the gesture. In some embodiments, if a multi-finger gesture with vertical movement is detected instead of gesture 514, other operations may be performed or gesture 514 may be ignored.

In some embodiments, in response to a determination that the first horizontal gesture satisfies a fifth set of one or more predefined conditions that is distinct from the first set of one or more predefined conditions and the second set of one or more predefined conditions, the device moves the insertion marker by one word in the text from the first position in accordance with the direction of the first horizontal gesture (662). For example, in FIG. 5F, gesture 522 is detected instead of gesture 506 (FIG. 5A). Gesture 522 includes horizontal movement 524. If device 100 determines that gesture 522 satisfies a fifth set of one or more predefined conditions that is distinct from the first or second set of predefined conditions, in response to the determination, insertion marker 504 is moved from Position 1 in FIG. 5F, in accordance with the direction of movement 524 of gesture 522, to Position 4 in FIG. 5G. Position 4 is located at the beginning of the next word (following the direction of movement 524 of gesture 522) from the word at the beginning of which Position 1 is located.

In some embodiments, the fifth set of one or more predefined conditions includes that the first horizontal gesture is a multi-finger gesture (e.g., a two-finger or three-finger swipe gesture) (664). For example, in FIGS. 5F-5G, insertion marker 504 is moved, from Position 1 to Position 4 (instead of Position 2) in response to multi-finger gesture 522. In some embodiments, insertion marker 504 is moved by one word if the horizontal gesture is a two-finger gesture, and moved by a different amount than one character or one word if the horizontal gesture is a three-finger gesture. In some embodiments, the fifth set of predefined conditions includes, in addition to the gesture being a multi-finger gesture, the initial speed of the multi-finger gesture being more than a predefined threshold velocity (e.g., 250, 333, or 500 points/sec).

In some embodiments, in response to a determination that the first horizontal gesture satisfies a sixth set of one or more predefined conditions that is distinct from the first set of one or more predefined conditions and the second set of one or more predefined conditions, the device moves the insertion marker to a beginning or an end of a line of text containing the first position in accordance with the direction of the first horizontal gesture (666). For example, in FIG. 5H, gesture 526 is detected instead of gesture 506 (FIG. 5A). Gesture 526 includes horizontal movement 528. If device 100 determines that gesture 526 satisfies a sixth set of one or more predefined conditions that is distinct from the first and second set of predefined conditions, in response to the determination, insertion marker 504 is moved from Position 1 in FIG. 5H to Position 5 in FIG. 5I, in accordance with the direction of movement 528 of gesture 526. Position 5 is located at the end of the line of text in which Position 1 is located.

In some embodiments, the insertion marker moves to the beginning of a next line of text after the line of text containing the first position, instead of moving to the end of the line of text containing the first position. For example, instead of moving to Position 5, the insertion marker may be moved to the beginning of the line of text after the line in which Position 1 is located.

In some embodiments, the sixth set of one or more predefined conditions includes that the first horizontal gesture is a multi-finger gesture (e.g., a two-finger or three-finger swipe gesture) (668). For example, in FIGS. 5H-5I, insertion marker 504 is moved, from Position 1 to Position 5 (instead of Position 2) in response to multi-finger gesture 526. In some embodiments, insertion marker 504 is moved to the beginning or end of the line of text where the first position is located if the gesture is a three-finger gesture, and moved by a different amount than one character or to the beginning/end of the line if the gesture is a two-finger gesture. In some embodiments, the sixth set of predefined conditions includes, in addition to the gesture being a multi-finger gesture, the initial speed of the multi-finger gesture being more than a predefined threshold velocity (e.g., 250, 333, or 500 points/sec).

In some embodiments, in response to a determination that the first horizontal gesture satisfies a seventh set of one or more predefined conditions that is distinct from the first set of one or more predefined conditions and the second set of one or more predefined conditions, the device moves the insertion marker to a beginning of a sentence containing the first position or a beginning of a next sentence after the sentence containing the first position in accordance with the direction of the first horizontal gesture (670). For example, in FIG. 5H, gesture 526 is detected instead of gesture 506 (FIG. 5A). Gesture 526 includes horizontal movement 528. If device 100 determines that gesture 526 satisfies a seventh set of one or more predefined conditions that is distinct from the first or second set of predefined conditions, in response to the determination, insertion marker 504 is moved from Position 1 in FIG. 5H to Position 6 in FIG. 5I, in accordance with the direction of movement 528 of gesture 526. Position 6 is located at the beginning of the next sentence after the sentence in which Position 1 is located.

In some embodiments, the insertion marker moves to the end of the sentence containing the first position, instead of moving to the beginning of the next sentence after the sentence containing the first position. For example, instead of moving to Position 6, the insertion marker may be moved to the end of the sentence in which Position 1 is located.

In some embodiments, the seventh set of one or more predefined conditions includes that the first horizontal gesture is a multi-finger gesture (e.g., a two-finger or three-finger swipe gesture) (672). For example, in FIGS. 5H and 5I, insertion marker 504 is moved from Position 1 to Position 6 (instead of Position 2) in response to multi-finger gesture 526. In some embodiments, insertion marker 504 is moved to the beginning of the sentence containing the first position or of the next sentence after the sentence containing the first position is located if the gesture is a three-finger gesture, and moved by a different amount than one character or to the beginning of the current/next sentence if the gesture is a two-finger gesture. In some embodiments, the seventh set of predefined conditions includes, in addition to the gesture being a multi-finger gesture, the initial speed of the multi-finger gesture being more than a predefined threshold velocity (e.g., 250, 333, or 500 points/sec).

In some embodiments, while displaying a range of selected text in the text of the electronic document (674), the device detects a second horizontal (or substantially horizontal, e.g., within 10, 20, or 30 degrees of horizontal) gesture on the touch-sensitive surface (676). For example, in FIG. 5K, while selection range 530 is displayed on touch screen 112 over selected text in text 502-1, gesture 532 is detected on touch screen 112. Gesture 532 includes horizontal movement 534.

In response to a determination that the second horizontal gesture satisfies an eighth set of one or more predefined conditions (678), the device places the insertion marker at a beginning or an end of the range of selected text in accordance with a direction of the second horizontal gesture (680) and deselects the range of selected text (682). For example, as shown in FIG. 5L, in response to a determination that gesture 532 satisfies an eighth set of one or more conditions, insertion marker 504 is placed at Position 7, which is at the end of selection range 530, and the text selected by selection range 530 is deselected (i.e., selection range 530 ceases to be displayed).

In some embodiments, the eighth set of one or more predefined conditions includes that the second horizontal gesture is a single-finger gesture (684). For example, insertion point 504 is placed at Position 7 and the text selected by selection range 530 is deselected in response to single-finger gesture 532. In some embodiments, if the second horizontal gesture is a multifinger gesture, the device extends the range of selected text in accordance with a direction of the second horizontal gesture (not shown). For example, a two-finger rightward swipe extends the end of the range by one character (or by one word), while a two-finger leftward swipe contracts the end of the range by one character (or by one word).

In some embodiments, in response to a determination that the vertical gesture satisfies a ninth set of one or more predefined conditions that is distinct from the third set of one or more predefined conditions and the fourth set of one or more predefined conditions, the device moves the insertion marker from the second position to a beginning of a paragraph containing the second position or to a beginning of a next paragraph after the paragraph containing the second position in accordance with the direction of the vertical gesture (654). For example, in FIG. 5M, gesture 536 is detected instead of gesture 514 (FIG. 5C). Gesture 536 includes vertical movement 538. If device 100 determines that gesture 536 satisfies a ninth set of one or more predefined conditions that is distinct from the third or fourth set of predefined conditions, in response to the determination, insertion marker 504 is moved from Position 2 in FIG. 5M to Position 8 in FIG. 5N. Position 8 is located at the beginning of the next paragraph after the paragraph containing Position 2, which is in accord with the downward direction of movement 538 of gesture 536.

In some embodiments, the insertion marker moves to the end of the paragraph containing the second position, instead of moving to the beginning of the next paragraph after the paragraph containing the second position.

In some embodiments, the ninth set of one or more predefined conditions includes that the vertical gesture is a multi-finger gesture (e.g., a two-finger or three-finger swipe gesture) (656). For example, in FIGS. 5M-5N, insertion marker 504 is moved, from Position 2 to Position 8 (instead of Position 3) in response to multi-finger gesture 536. In some embodiments, insertion marker 504 is moved to the beginning of the current or next paragraph if the gesture is a two-finger gesture, and moved by a different amount if the gesture is a three-finger gesture. In some embodiments, the ninth set of predefined conditions includes the initial speed of the multi-finger gesture being more than a predefined threshold velocity (e.g., 250, 333, or 500 points/sec).

In some embodiments, in response to a determination that the vertical gesture satisfies a tenth set of one or more predefined conditions that is distinct from the third set of one or more predefined conditions and the fourth set of one or more predefined conditions, the device moves the insertion marker from the second position to a beginning of a page containing the second position or to a beginning of a next page after the page containing the second position in accordance with the direction of the vertical gesture (658). For example, in FIG. 5O, gesture 540 is detected instead of gesture 514 (FIG. 5C). Gesture 540 includes vertical movement 542. If device 100 determines that gesture 540 satisfies a tenth set of one or more predefined conditions different from the third or fourth set of predefined conditions, in response to the determination, insertion marker 504 is moved from Position 2 in FIG. 5O to Position 9 in FIG. 5P. Position 9 is located at the beginning of the next page (containing text 502-2) after the page containing Position 2, which is in accord with the downward direction (corresponding to the forward direction in text 502) of movement 542 of gesture 540. In some embodiments, the insertion marker moves to the end of the page containing the second position, instead of moving to the beginning of the next page after the page containing the second position.

In some embodiments, the tenth set of one or more predefined conditions includes that the vertical gesture is a multi-finger gesture (e.g., a two-finger or three-finger swipe gesture) (660). For example, in FIGS. 5O-5P, insertion marker 504 is moved, from Position 2 to Position 9 (instead of Position 3) in response to multi-finger gesture 536. In some embodiments, insertion marker 504 is moved to the beginning of the current or next page if the gesture is a three-finger gesture, and moved by a different amount if the gesture is a two-finger gesture. In some embodiments, the tenth set of predefined conditions includes the initial speed of the multi-finger gesture being more than a predefined threshold velocity (e.g., 250, 333, or 500 points/sec).

Figure 7:
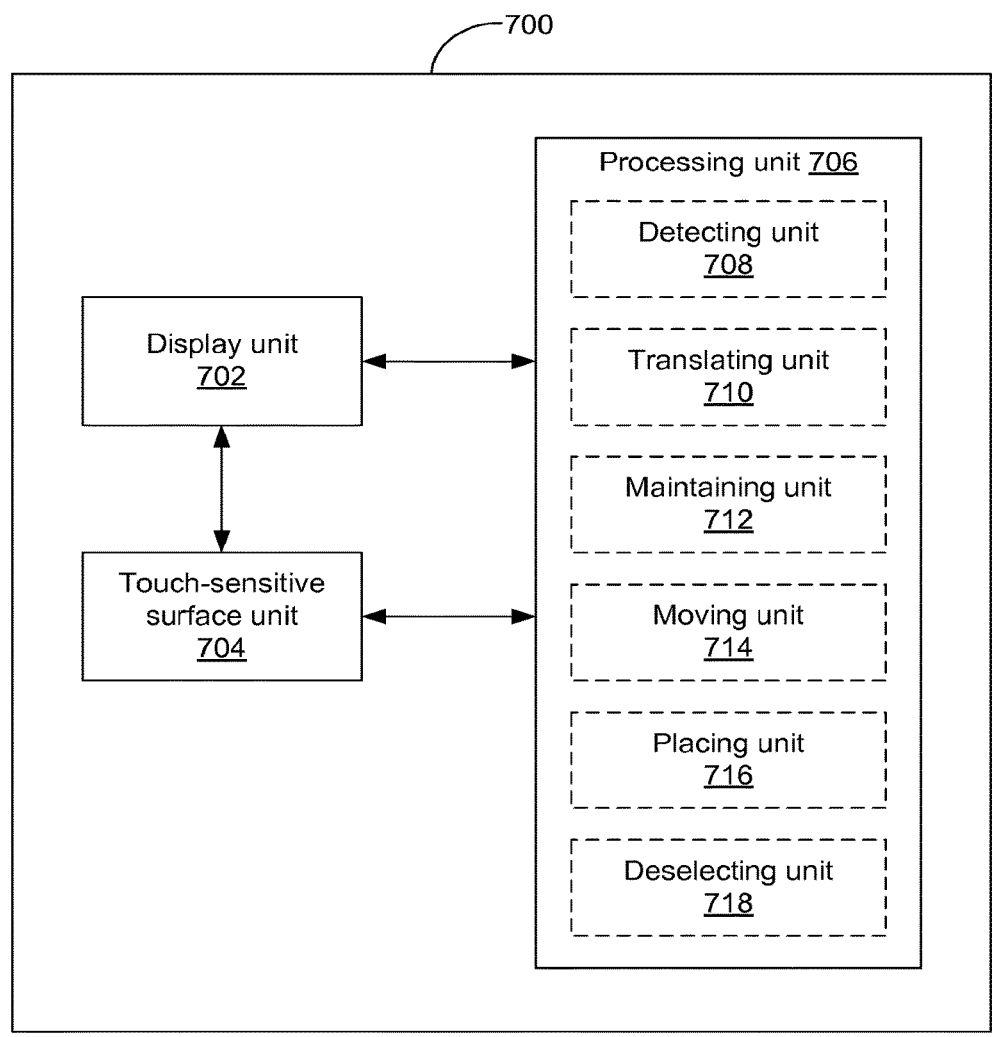
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to display text of an electronic document and an insertion marker at a first position in the text of the electronic document, a touch-sensitive surface unit 704 configured to receive gestures, and a processing unit 706 coupled to the display unit 702 and the touch-sensitive surface unit 704. In some embodiments, the processing unit 706 includes a detecting unit 708, a translating unit 710, a maintaining unit 712, a moving unit 714, a placing unit 716, and a deselecting unit 718.

The processing unit 706 is configured to detect a first horizontal gesture on the touch-sensitive surface unit 704 (e.g., with the detecting unit 708); in response to a determination that the first horizontal gesture satisfies a first set of one or more predefined conditions, translate the electronic document on the display unit 702 in accordance with a direction of the first horizontal gesture (e.g., with the translating unit 710), and maintain the insertion marker at the first position in the text (e.g., with the maintaining unit 712); and, in response to a determination that the first horizontal gesture satisfies a second set of one or more predefined conditions that is distinct from the first set of one or more predefined conditions, move the insertion marker by one character in the text from the first position to a second position in the text in accordance with the direction of the first horizontal gesture (e.g., with the moving unit 714).

In some embodiments, the first set of one or more predefined conditions includes an initial velocity of the first horizontal gesture being less than a predefined threshold velocity, and the second set of one or more predefined conditions includes the initial velocity of the first horizontal gesture being more than the predefined threshold velocity.

In some embodiments, the first horizontal gesture includes a finger contact and movement of the finger contact, the first set of one or more predefined conditions includes an initial movement of the finger contact in a predefined initial time since detecting the finger contact being less than a predefined initial movement threshold, and the second set of one or more predefined conditions includes the initial movement of the finger contact in the predefined initial time since detecting the finger contact being greater than the predefined initial movement threshold.

In some embodiments, the second set of one or more predefined conditions includes that the first horizontal gesture is a single-finger gesture.

In some embodiments, the processing unit 706 is configured to: while the display unit 702 displays the insertion marker at the second position in the text of the electronic document, detect a vertical gesture on the touch-sensitive surface unit 704 (e.g., with the detecting unit 708); in response to a determination that the vertical gesture satisfies a third set of one or more predefined conditions, translate the electronic document on the display unit 702 in accordance with a direction of the vertical gesture (e.g., with the translating unit 710), and maintain the insertion marker at the second position in the text (e.g., with the maintaining unit 712); and, in response to a determination that the vertical gesture satisfies a fourth set of one or more predefined conditions that is distinct from the third set of one or more predefined conditions, move the insertion marker from a line in the text containing the second position to a vertically adjacent line in the text in accordance with the direction of the vertical gesture (e.g., with the moving unit 714).

In some embodiments, the third set of one or more predefined conditions includes an initial velocity of the vertical gesture being less than a predefined threshold velocity, and the fourth set of one or more predefined conditions includes the initial velocity of the vertical gesture being more than the predefined threshold velocity.

In some embodiments, the vertical gesture includes a finger contact and movement of the finger contact, the third set of one or more predefined conditions includes an initial movement of the finger contact in a predefined initial time since detecting the finger contact being less than a predefined initial movement threshold, and the fourth set of one or more predefined conditions includes the initial movement of the finger contact in the predefined initial time since detecting the finger contact being greater than the predefined initial movement threshold.

In some embodiments, the fourth set of one or more predefined conditions includes that the vertical gesture is a single-finger gesture.

In some embodiments, the processing unit 706 is configured to, in response to a determination that the first horizontal gesture satisfies a fifth set of one or more predefined conditions that is distinct from the first set of one or more predefined conditions and the second set of one or more predefined conditions, move the insertion marker by one word in the text from the first position in accordance with the direction of the first horizontal gesture (e.g., with the moving unit 714).

In some embodiments, the fifth set of one or more predefined conditions includes that the first horizontal gesture is a multi-finger gesture.

In some embodiments, the processing unit 706 is configured to, in response to a determination that the first horizontal gesture satisfies a sixth set of one or more predefined conditions that is distinct from the first set of one or more predefined conditions and the second set of one or more predefined conditions, move the insertion marker to a beginning or an end of a line of text containing the first position in accordance with the direction of the first horizontal gesture (e.g., with the moving unit 714).

In some embodiments, the sixth set of one or more predefined conditions includes that the first horizontal gesture is a multi-finger gesture.

In some embodiments, the processing unit 706 is configured to, in response to a determination that the first horizontal gesture satisfies a seventh set of one or more predefined conditions that is distinct from the first set of one or more predefined conditions and the second set of one or more predefined conditions, move the insertion marker to a beginning of a sentence containing the first position or a beginning of a next sentence after the sentence containing the first position in accordance with the direction of the first horizontal gesture (e.g., with the moving unit 714).

In some embodiments, the seventh set of one or more predefined conditions includes that the first horizontal gesture is a multi-finger gesture.

In some embodiments, the processing unit 706 is configured to, while the display unit 702 displays a range of selected text in the text of the electronic document: detect a second horizontal gesture on the touch-sensitive surface unit 704 (e.g., with the detecting unit 708); and, in response to a determination that the second horizontal gesture satisfies an eighth set of one or more predefined conditions, place the insertion marker at a beginning or an end of the range of selected text in accordance with a direction of the second horizontal gesture (e.g., with the placing unit 716), and deselect the range of selected text (e.g., with the deselecting unit 718).

In some embodiments, the eighth set of one or more predefined conditions includes that the second horizontal gesture is a single-finger gesture.

In some embodiments, the processor is configured to, in response to a determination that the vertical gesture satisfies a ninth set of one or more predefined conditions that is distinct from the third set of one or more predefined conditions and the fourth set of one or more predefined conditions, move the insertion marker from the second position to a beginning of a paragraph containing the second position or to a beginning of a next paragraph after the paragraph containing the second position in accordance with the direction of the vertical gesture (e.g., with the moving unit 714).

In some embodiments, the ninth set of one or more predefined conditions includes that the vertical gesture is a multi-finger gesture.

In some embodiments, the processor is configured to, in response to a determination that the vertical gesture satisfies a tenth set of one or more predefined conditions that is distinct from the third set of one or more predefined conditions and the fourth set of one or more predefined conditions, move the insertion marker from the second position to a beginning of a page containing the second position or to a beginning of a next page after the page containing the second position in accordance with the direction of the vertical gesture (e.g., with the moving unit 714).

In some embodiments, the tenth set of one or more predefined conditions includes that the vertical gesture is a multi-finger gesture.

In some embodiments, the display unit 702 is a touch-sensitive display unit and the touch-sensitive surface unit 704 is on the display unit 702.

It should be appreciated that while the embodiments described above are directed to movement of an insertion marker within text, the embodiments described above may be used in an analogous manner to move, position, or otherwise manipulate other types of insertion markers or cursors, such as moving a current cell highlight or focus in a spreadsheet application or changing a current shape or object highlight/focus in a drawing or presentation application.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6F may be implemented by components depicted in FIGS. 1A-1B. For example, detection operation 608, translation operation 614, maintaining operation 616, and moving operation 622 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
   displaying text of an electronic document on the display;
   displaying an insertion marker at a first position in the text of the electronic document, the text around the first position having a visual appearance;
   detecting a first input at a location on the touch-sensitive surface, the location n the touch sensitive surface corresponding to a location on the display where the text of the electronic document is displayed other than the first position in the text and a second position in the text, wherein the first input is an input in a first direction; and
   in response to detecting the first input:
   in accordance with a determination that the first input in the first direction at the location on the touch-sensitive surface that corresponds to the location on the display satisfies a first set of one or more predefined conditions:
   translating the electronic document on the display, and
   maintaining the insertion marker at the first position in the text; and,
   in accordance with a determination that the first input in the first direction at the location on the touch-sensitive surface that corresponds to the location on the display satisfies a second set of one or more predefined conditions that is distinct from the first set of one or more predefined conditions, the second set of one or more predefined conditions including a condition that the first input has a speed greater than a predefined threshold velocity:
   moving the insertion marker in the text from the first position to the second position in the text, and maintaining the visual appearance of the text around the first position in the text.

2. The device of claim 1, wherein the first set of one or more predefined conditions comprises that a magnitude of a characteristic of the input is less than a predetermined threshold magnitude.

3. The device of claim 1, wherein the second set of one or more predefined conditions comprises that a magnitude of a characteristic of the input is greater than a predetermined threshold magnitude.

4. The device of claim 1, wherein the first set of one or more predefined conditions comprises that the first input comprises a first predefined number of contacts.

5. The device of claim 1, wherein the second set of one or more predefined conditions comprises that the first input comprises a second predefined number of contacts.

6. The device of claim 1, wherein the first set of one or more predefined conditions comprises that the first input comprises movement of a contact in a first predefined direction.

7. The device of claim 1, wherein the second set of one or more predefined conditions comprises that the first input comprises movement of a contact in a second predefined direction.

8. The device of claim 1, wherein moving the insertion marker in the text from the first position to the second position in the text comprises moving the insertion marker by one character.

9. The device of claim 1, wherein moving the insertion marker in the text from the first position to the second position in the text comprises moving the insertion marker by one word.

10. The device of claim 1, wherein moving the insertion marker in the text from the first position to the second position in the text comprises moving the insertion marker to an adjacent line in the text.

11. The device of claim 1, wherein moving the insertion marker in the text from the first position to the second position in the text comprises moving the insertion marker to an edge of a line in which the insertion marker is currently located.

12. The device of claim 1, wherein moving the insertion marker in the text from the first position to the second position in the text comprises moving the insertion marker to an edge of a sentence in which the insertion marker is currently located.

13. The device of claim 1, wherein moving the insertion marker in the text from the first position to the second position in the text comprises moving the insertion marker to an edge of a selected portion of the text in which the insertion marker is currently located.

14. The device of claim 1, wherein moving the insertion marker in the text from the first position to the second position in the text comprises moving the insertion marker to an edge of a paragraph in which the insertion marker is currently located.

15. The device of claim 1, wherein moving the insertion marker in the text from the first position to the second position in the text comprises moving the insertion marker to an edge of a page in which the insertion marker is currently located.

16. The device of claim 1, wherein:
determining whether the first input satisfies the first set of one or more predefined conditions includes comparing a magnitude of the first input with one or more threshold values; and
determining whether the first input satisfies the second set of one or more predefined conditions includes comparing a magnitude of the first input with one or more threshold values.

17. The device of claim 1, wherein the second position in the text is predetermined.

18. The device of claim 1, wherein the second position in the text is not determined in accordance with a length of the first input.

19. The device of claim 1, wherein maintaining the insertion marker at the first position in the text includes moving, on the display, the insertion marker and the text according to the first input.

20. A computer-implemented method, comprising:
at a device with a display and a touch-sensitive surface:
displaying text of an electronic document on the display;
displaying an insertion marker at a first position in the text of the electronic document, the text around the first position having a visual appearance;
detecting a first input at a location on the touch-sensitive surface, the location on the touch-sensitive surface corresponding to a location on the display where the text of the electronic document is displayed other than the first position in the text and a second position in the text, wherein the first input is an input in a first direction; and
in response to detecting the first input:
in accordance with a determination that the first input in the first direction at the location on the touch-sensitive surface that corresponds to the location on the display satisfies a first set of one or more predefined conditions:
translating the electronic document on the display, and
maintaining the insertion marker at the first position in the text; and,
in accordance with a determination that the first input in the first direction at the location on the touch-sensitive surface that corresponds to the location on the display satisfies a second set of one or more predefined conditions that is distinct from the first set of one or more predefined conditions, the second set of one or more predefined conditions including a condition that the first input has a speed greater than a predefined threshold velocity:
moving the insertion marker in the text from the first position to the second position in the text, and
maintaining the visual appearance of the text around the first position in the text.

21. The computer-implemented method of claim 20, wherein the first set of one or more predefined conditions comprises that a magnitude of a characteristic of the input is less than a predetermined threshold magnitude, and wherein the second set of one or more predefined conditions comprises that a magnitude of a characteristic of the input is greater than a predetermined threshold magnitude.

22. The computer-implemented method of claim 20, wherein the first set of one or more predefined conditions comprises that the first input comprises a first predefined number of contacts, and wherein the second set of one or more predefined conditions comprises that the first input comprises a second predefined number of contacts.

23. The computer-implemented method of claim 20, wherein the first set of one or more predefined conditions comprises that the first input comprises movement of a contact in a first predefined direction, and wherein the second set of one or more predefined conditions comprises that the first input comprises movement of a contact in a second predefined direction.

24. The computer-implemented method of claim 20, wherein moving the insertion marker in the text from the first position to the second position in the text comprises moving the insertion marker:
   by one character;
   by one word; or
   to an adjacent line in the text.

25. The computer-implemented method of claim 20, wherein moving the insertion marker in the text from the first position to the second position in the text comprises moving the insertion marker:
   to an edge of a line in which the insertion marker is currently located;
   to an edge of a sentence in which the insertion marker is currently located;
   to an edge of a paragraph in which the insertion marker is currently located; or
   to an edge of a page in which the insertion marker is currently located.

26. The computer-implemented method of claim 20, wherein moving the insertion marker in the text from the first position to the second position in the text comprises moving the insertion marker to an edge of a selected portion of the text in which the insertion marker is currently located.

27. The computer-implemented method of claim 20, wherein:
   determining whether the first input satisfies the first set of one or more predefined conditions includes comparing a magnitude of the first input with one or more threshold values; and
   determining whether the first input satisfies the second set of one or more predefined conditions includes comparing a magnitude of the first input with one or more threshold values.

28. The computer-implemented method of claim 20, wherein the second position in the text is predetermined.

29. The computer-implemented method of claim 20, wherein the second position in the text is not determined in accordance with a length of the first input.

30. The computer-implemented method of claim 20, wherein maintaining the insertion marker at the first position in the text includes moving, on the display, the insertion marker and the text according to the first input.

31. A non-transitory computer-readable medium having stored thereon instructions which, when executed by a device with a touch-sensitive surface and a display, cause the device to:
   display text of an electronic document on the display;
   display an insertion marker at a first position in the text of the electronic document, the text around the first position having a visual appearance;
   detecting a first input at a location on the touch-sensitive surface, the location on the touch-sensitive surface corresponding to a location on the display where the text of the electronic document is displayed other than the first position in the text and a second position in the text, wherein the first input is an input in a first direction; and
   in response to detecting the first input:
      in accordance with a determination that the first input in the first direction at the location on the touch-sensitive surface that corresponds to the location on the display satisfies a first set of one or more predefined conditions:
         translate the electronic document on the display, and
         maintain the insertion marker at the first position in the text; and,
      in accordance with a determination that the first input in the first direction at the location on the touch-sensitive surface that corresponds to the location on the display satisfies a second set of one or more predefined conditions that is distinct from the first set of one or more predefined conditions, the second set of one or more predefined conditions including a condition that the first input has a speed greater than a predefined threshold velocity:
         move the insertion marker in the text from the first position to the second position in the text, and
         maintain the visual appearance of the text around the first position in the text.

32. The non-transitory computer-readable medium of claim 31, wherein the first set of one or more predefined conditions comprises that a magnitude of a characteristic of the input is less than a predetermined threshold magnitude.

33. The non-transitory computer-readable medium of claim 31, wherein the second set of one or more predefined conditions comprises that a magnitude of a characteristic of the input is greater than a predetermined threshold magnitude.

34. The non-transitory computer-readable medium of claim 31, wherein the first set of one or more predefined conditions comprises that the first input comprises a first predefined number of contacts.

35. The non-transitory computer-readable medium of claim 31, wherein the second set of one or more predefined conditions comprises that the first input comprises a second predefined number of contacts.

36. The non-transitory computer-readable medium of claim 31, wherein the first set of one or more predefined conditions comprises that the first input comprises movement of a contact in a first predefined direction.

37. The non-transitory computer-readable medium of claim 31, wherein the second set of one or more predefined conditions comprises that the first input comprises movement of a contact in a second predefined direction.

38. The non-transitory computer-readable medium of claim 31, wherein moving the insertion marker in the text from the first position to the second position in the text comprises moving the insertion marker:
   by one character;
   by one word; or
   to an adjacent line in the text.

39. The non-transitory computer-readable medium of claim 31, wherein moving the insertion marker in the text from the first position to the second position in the text comprises moving the insertion marker:
   to an edge of a line in which the insertion marker is currently located;
   to an edge of a sentence in which the insertion marker is currently located;
   to an edge of a paragraph in which the insertion marker is currently located; or
   to an edge of a page in which the insertion marker is currently located.

40. The non-transitory computer-readable medium of claim 31, wherein moving the insertion marker in the text from the first position to the second position in the text comprises moving the insertion marker to an edge of a selected portion of the text in which the insertion marker is currently located.

41. The non-transitory computer-readable medium of claim 31, wherein:
   determining whether the first input satisfies the first set of one or more predefined conditions includes comparing a magnitude of the first input with one or more threshold values; and
   determining whether the first input satisfies the second set of one or more predefined conditions includes comparing a magnitude of the first input with one or more threshold values.

42. The non-transitory computer-readable medium of claim 31, wherein the second position in the text is predetermined.

43. The non-transitory computer-readable medium of claim 31, wherein the second position in the text is not determined in accordance with a length of the first input.

44. The non-transitory computer-readable medium of claim 31, wherein maintaining the insertion marker at the first position in the text includes moving, on the display, the insertion marker and the text according to the first input.

* * * * *

UNITED STATES PATENT AND TRADEMARK OFFICE
CERTIFICATE OF CORRECTION

PATENT NO. : 10,013,161 B2
APPLICATION NO. : 14/707250
DATED : July 3, 2018
INVENTOR(S) : Martin J. Murrett et al.

Page 1 of 1

It is certified that error appears in the above-identified patent and that said Letters Patent is hereby corrected as shown below:

In Claim 1, at Column 36, Line 40, delete "n" and insert -- on --, therefor.

Signed and Sealed this
Eighteenth Day of September, 2018

Andrei Iancu
*Director of the United States Patent and Trademark Office*